(12) United States Patent
Ross et al.

(10) Patent No.: US 9,942,776 B2
(45) Date of Patent: *Apr. 10, 2018

(54) MESH NETWORK ADJUSTMENT

(71) Applicant: Vivint, Inc., Provo, UT (US)

(72) Inventors: Kevin Ross, Saratoga Springs, UT (US); Venkat Kalkunte, Saratoga, CA (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,180

(22) Filed: Nov. 3, 2016

(65) Prior Publication Data

US 2017/0134965 A1 May 11, 2017

Related U.S. Application Data

(63) Continuation of application No. 14/729,728, filed on Jun. 3, 2015, now Pat. No. 9,491,764.

(51) Int. Cl.
| *H04W 16/28* | (2009.01) |
| *H04W 72/04* | (2009.01) |
| *H04W 4/02* | (2018.01) |
| *H04W 40/20* | (2009.01) |
| *H04W 84/18* | (2009.01) |

(52) U.S. Cl.
CPC .......... *H04W 16/28* (2013.01); *H04W 4/02* (2013.01); *H04W 40/20* (2013.01); *H04W 72/046* (2013.01); *H04W 84/18* (2013.01)

(58) Field of Classification Search
CPC ... H04W 16/28; H04W 40/20; H04W 72/046; H04W 4/023; H04W 4/02; H04W 4/003
See application file for complete search history.

(56) References Cited

U.S. PATENT DOCUMENTS

| 6,330,459 | B1 | 12/2001 | Crichton et al. |
| 7,228,123 | B2 | 6/2007 | Moursund et al. |
| 8,750,896 | B2 | 6/2014 | Brisebois et al. |
| 8,942,938 | B2 | 1/2015 | Bishop |
| 9,538,331 | B2 * | 1/2017 | Ross ..................... H04W 4/023 |
| 2003/0195017 | A1 | 10/2003 | Chen et al. |
| 2004/0235484 | A1 | 11/2004 | Korpela et al. |
| 2007/0088709 | A1 | 4/2007 | Bailey et al. |
| 2009/0274130 | A1 | 11/2009 | Boch |

(Continued)

FOREIGN PATENT DOCUMENTS

| GB | 2500927 A | 10/2013 |
| WO | 2013089731 A1 | 6/2013 |

(Continued)

*Primary Examiner* — Leon Flores
(74) *Attorney, Agent, or Firm* — Holland & Hart LLP

(57) ABSTRACT

Methods, apparatuses, and systems relating to narrow beam communications and wireless networking are disclosed. Exemplary methods for wireless networking and communications may include identifying a geographic area, receiving location data relating to the geographic area, receiving network performance data, analyzing the location data and the network performance data, identifying a first access point in the geographic area based at least in part on the analyzing, and adjusting a narrow beam communication device a predetermined amount relating to the first access point based at least in part on the analyzing.

20 Claims, 16 Drawing Sheets

(56) References Cited

U.S. PATENT DOCUMENTS

| | | | |
|---|---|---|---|
| 2010/0151865 | A1 | 6/2010 | Camp, Jr. et al. |
| 2011/0075601 | A1 | 3/2011 | Zheng |
| 2013/0095747 | A1 | 4/2013 | Moshfeghi |
| 2014/0044043 | A1 | 2/2014 | Moshfeghi |
| 2015/0029176 | A1 | 1/2015 | Baxter et al. |
| 2016/0127920 | A1 | 5/2016 | Thomas et al. |

FOREIGN PATENT DOCUMENTS

| | | |
|---|---|---|
| WO | 2014009246 A1 | 1/2014 |
| WO | 2014018052 A1 | 1/2014 |
| WO | 2014196962 A1 | 12/2014 |

\* cited by examiner

MESH NETWORK ADJUSTMENT

CROSS-REFERENCE TO RELATED APPLICATIONS

The present disclosure application is a continuation of U.S. patent application Ser. No. 14/729,728, titled: "Mesh Network Adjustment", filed on Jun. 3, 2015. The disclosure of which is incorporated by reference herein in its entirety.

BACKGROUND

The present disclosure, for example, relates to wireless networks and communications including, but not limited to, security and/or automation systems, and more particularly to narrow beam mesh networking and related operations and techniques.

Wired and wireless networking and communication systems are widely deployed to provide various types of communication and functional features, including but not limited to those for security and automation systems, such as monitoring, communication, notification, and/or others. These systems may be capable of supporting communication with a user through a communication connection or a system management action.

Current networking systems exhibit many shortcomings, including failing to account for signal inhibitors, using broad-range signals that may affect network performance and other access points, failing to adjust dynamically, and other problems. Moreover, current network designs fail to account for real-world, application-based problems or require complicated analysis that relies on human action, resulting in extensive time and cost requirements. In addition, current system designs and networks fail to dynamically adjust as needed. Thus, there exists multiple needs in the art for improved systems and methods relating to wireless communication network design and operation.

SUMMARY

The present system and methods relate to narrow beam mesh networks, associated systems, and operations relating to network communications, including, in some embodiments, adjustments. The present systems and methods may facilitate designing, operating, and/or adjusting wireless network communications. In some embodiments, the present systems and methods relate to and account for application-based problems like signal inhibitors, lines of sight, relative locations and operations of system components and/or elements, among others.

The present systems and methods relate to determining lines of sight relevant to wireless communications, including millimeter and non-millimeter waves, and operations relating to one or more access points. The present systems and methods also relate to designing, operating, and/or adjusting wireless network communications, including the relative position of system components, such as access points. The present systems and methods may be based at least in part on one or more narrow beam communication signals, including how these narrow beam communication signals relate to structures, signal inhibitors, access points, customer premises devices (CPEs), other devices, and/or additional system components.

Methods for wireless networking and communications are disclosed. In some embodiments, methods may include identifying a geographic area, receiving topography data related to the geographic area, analyzing the topography data, identifying a first line of sight path related to a first access point location and one or more customer premises device locations based at least in part on the analyzing, and/or identifying a second line of sight path based at least in part on a predetermined amount.

In some embodiments, the predetermined amount may include a degree value. In some embodiments, the predetermined amount may include a relative relationship between to the first line of sight path and the second line of sight path. In some embodiments, the second line of sight path relates to a second access point location and the first access point location.

In some embodiments, analyzing the topography data may include determining relative positions of the first access point location and the second access point location based at least in part on one or more operating characteristics. In some embodiments, the second line of sight path relates to a second access point location and/or one or more other customer premises device locations, which may be based at least in part on the analyzing.

In some embodiments, analyzing the topography data may include determining a line of sight between two or more locations within the geographic area. In some embodiments, the topography data may include at least one of satellite imaging data, or flyover imaging data, or user device captured data, or a combination thereof. In some embodiments, analyzing the topography data may include comparing the first access point location and the one or more customer premises device locations with a location of one or more signal inhibitors.

In some embodiments, analyzing the topography data may include calculating a distance between the first access point location and a second access point location. In some embodiments, analyzing the topography data may include comparing a visual characteristic of one or more points within the geographic area. In some embodiments, the visual characteristic may include at least one of a texture, or a color, or a shape, or a reflectivity, or a structure type, or a combination thereof.

In some embodiments, methods may include positioning at least one of a first access point at the first access point location and/or one or more customer premises devices based at least in part on the identifying the first line of sight path. In some embodiments, methods may include initiating a narrow beam communication relating to the first access point and/or the one or more customer premises devices.

In some embodiments, the narrow beam communication may include a communication in a range of 1 degree to 45 degrees. In some embodiments, the narrow beam communication may include a millimeter wave signal. In some embodiments, the narrow beam communication may include a non-millimeter wave signal.

Apparatuses for wireless networking and communications are disclosed. In some embodiments, apparatuses may include a processor, memory in electronic communication with the processor, and/or instructions stored in the memory. In some embodiments, the instructions may be executable by the processor to identify a geographic area, receive topography data related to the geographic area, analyze the topography data, identify a first line of sight path related to a first access point location and one or more customer premises device locations based at least in part on the analyzing, and/or identify a second line of sight path based at least in part on a predetermined amount.

In some embodiments, the predetermined amount may include a relative angle between the first line of sight path and the second line of sight path. In some embodiments, the predetermined amount may include a relative direction between the first line of sight path and the second line of sight path.

Non-transitory computer-readable mediums storing computer-executable code are disclosed. In some embodiments, the code may be executable by a processor to identify a geographic area, receive topography data related to the geographic area, analyze the topography data, identify a first line of sight path related to a first access point location and/or one or more customer premises device locations based at least in part on the analyzing, and/or identify a second line of sight path based at least in part on a predetermined amount.

Methods for wireless networking and communications are disclosed. In some embodiments, methods may include identifying a geographic area, receiving location data relating to the geographic area, receiving network performance data, analyzing the location data and the network performance data, identifying a first access point in the geographic area based at least in part on the analyzing, and/or adjusting a narrow beam communication device a predetermined amount relating to the first access point based at least in part on the analyzing.

In some embodiments, adjusting the narrow beam communication device may include adjusting a direction of the narrow beam communication device by the predetermined amount. In some embodiments, adjusting the direction may include rotating the direction of the narrow beam communication device. In some embodiments, adjusting the direction is based at least in part on a second access point location.

In some embodiments, method may include identifying a first line of sight path related to the first access point. In some embodiments, adjusting the narrow beam communication device may include adjusting a direction of the first access point the predetermined amount relative to the first line of sight path.

In some embodiments, the first line of sight path relates to the first access point and/or one or more user premises devices. In some embodiments, the first line of sight path relates to the first access point and/or one or more other access points. In some embodiments, methods may include identifying a second line of sight path related to a second access point. In some embodiments, adjusting the narrow beam communication device may include adjusting a direction of the second access point based at least in part on adjusting the direction of the first access point.

In some embodiments, the network performance data may include historical performance data relating to at least one of an access point and/or a customer premises device in the geographic area. In some embodiments, analyzing the network performance data may include determining one or more trends based at least in part on the historical performance data. In some embodiments, analyzing the network performance data may include correlating performance of a customer premises device with performance of the first access point.

In some embodiments, analyzing the network performance data may include correlating performance of two or more customer premises devices with performance of the first access point. In some embodiments, analyzing the network performance data may include correlating performance of a customer premises device with performance of the first access point and/or a second access point. In some embodiments, the network performance data may include a notification relating to network performance within the geographic area.

In some embodiments, methods may include identifying a second access point in the geographic area based at least in part on the analyzing, determining a performance indicator relating to the first access point, and/or adjusting a narrow beam communication device relating to the second access point based at least in part on the determining In some embodiments, analyzing the network performance data may include determining interference relating to the first access point.

Apparatuses for wireless networking and communications are disclosed. In some embodiments, the apparatuses may include a processor, memory in electronic communication with the processor, and instructions stored in the memory. In some embodiments, the instructions may be executable by the processor to identify a geographic area, receive location data relating to the geographic area, receive network performance data, analyze the location data and the network performance data, identify a first access point in the geographic area based at least in part on the analyzing, and/or adjust a narrow beam communication device a predetermined amount relating to the first access point based at least in part on the analyzing.

In some embodiments, adjusting the narrow beam communication device may include adjusting a direction of the narrow beam communication device based at least in part on a location of two or more access points within the geographic area. In some embodiments, adjusting the narrow beam communication device may include adjusting a direction of the narrow beam communication device based at least in part on a location of a backhaul connection within the geographic area.

Non-transitory computer-readable mediums storing computer-executable code are disclosed. In some embodiments, the code may be executable by a processor to identify a geographic area, receive location data relating to the geographic area, receive network performance data, analyze the location data and the network performance data, identify a first access point in the geographic area based at least in part on the analyzing, and/or adjust a narrow beam communication device a predetermined amount relating to the first access point based at least in part on the analyzing.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Current wireless communication system designs and applications fail to adequately address existing problems such as signal inhibition, channel interference, and identifying a network structure and position that facilitates reliable and fast communications despite real-world organization, structure, and challenges. The present systems and methods relate to narrow beam network design and operation, among other things. Methods and operations are disclosed that relate to determining locations of network components and elements, along with lines of sight. In some cases, these lines of sight may facilitate wireless communications, like narrow beams, whether used with millimeter wave and/or other communications.

Some aspects of the present systems and methods relate to determining the lines of sight and the appropriate locations (based on analysis, identification, and/or determining) of certain system components, such as access points. By identifying one or more possible locations of the access points, the narrow beam communications can also be organized, weighed, and determined. These narrow beam communications may be oriented or organized based on many things, including absolute and/or relative: directions, widths, channels, locations of structures and/or signal inhibitors, locations of customer devices, and many other things. Likewise, as part of network organization, planning, design, or based on an existing network, one or more devices and/or operations may be adjusted. These adjustments may account for one or more changes relating to topography, system performance, algorithms, steps, customer device demand, and/or other factors, among other things.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Millimeter waves are radio waves with wavelength in the range of approximately 1 millimeter to approximately 10 mm, which corresponds to a radio frequency of approximately 30 GigaHertz (GHz) to approximately 300 GHz. These frequencies may also be referred to as the Extremely High Frequency band. These radio waves may in some circumstances exhibit unique propagation characteristics. For example, compared with lower frequency radio waves, millimeter waves suffer higher propagation loss and/or signal attenuation, have a poorer ability to penetrate objects, such as buildings, walls, foliage, and are more susceptible to atmosphere absorption, deflection, and/or diffraction due to air characteristics.

Figure 1:
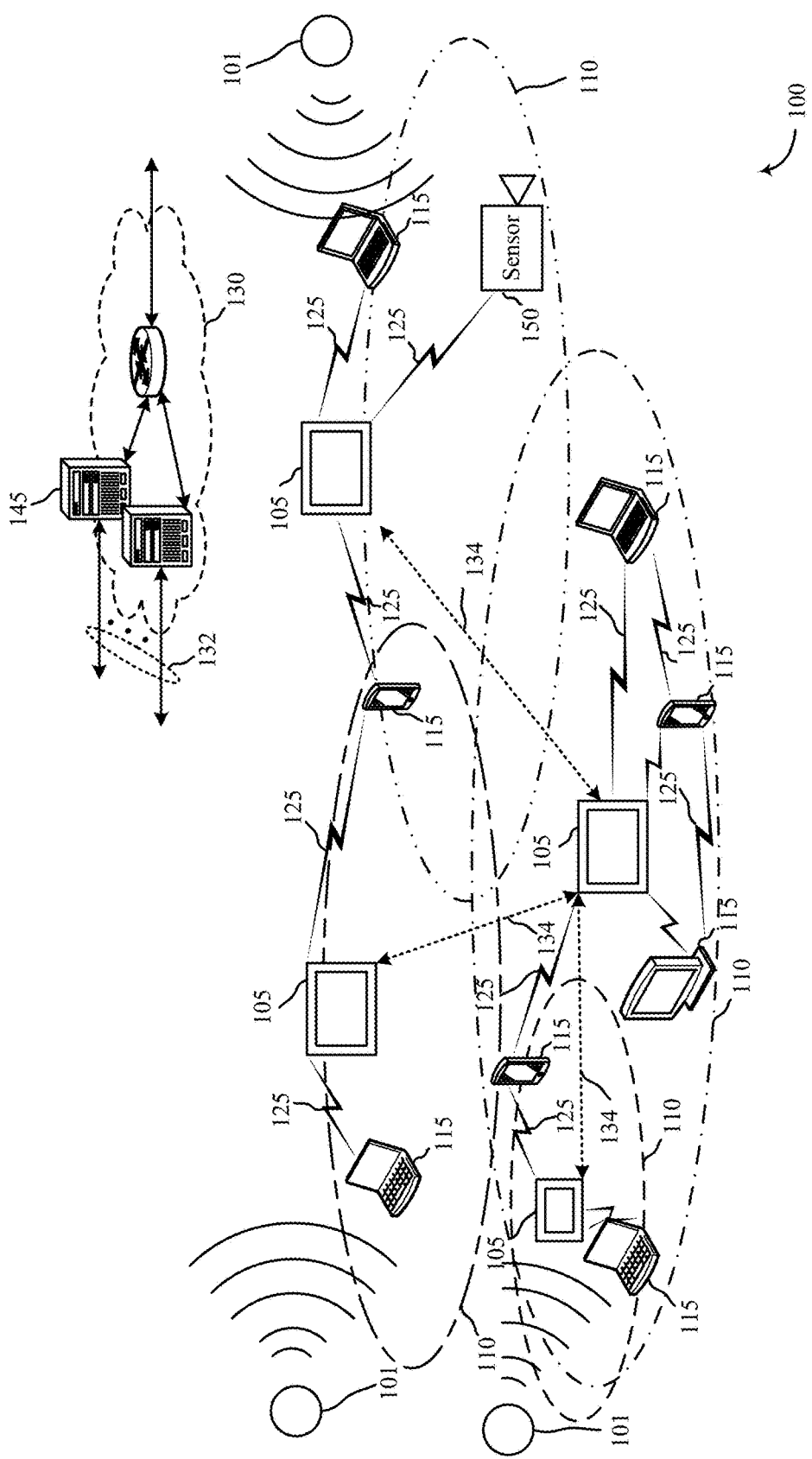
FIG. 1 shows a block diagram relating to wireless networking and communication systems, in accordance with various aspects of this disclosure.

FIG. 1 illustrates an example of a communications system 100 in accordance with various aspects of the disclosure. The communications system 100 may include access points 101, apparatuses 105, devices 115, a network 130, and/or sensors 150, among other things. The network 130 may provide user authentication, encryption, access authorization, tracking, Internet Protocol (IP) connectivity, and other access, calculation, modification, and/or functions.

The apparatuses 105 may interface with the network 130 through a first set of wired and/or wireless communication links 132 to communicate with one or more remote servers 145. The apparatuses 105 may perform communication configuration, adjustment, and/or scheduling for communication with the devices 115 and/or access points 101, or may operate under the control of a controller. In various examples, the apparatuses 105 may communicate—either directly or indirectly (e.g., through network 130)—with each other over a second set of wired and/or wireless communication links 134. Apparatuses 105 may communicate with a back end server (such as the remote servers 145)—directly and/or indirectly—using the first set of one or more communication links 132.

The access points 101 may interface with the network 130 through a first set of wired and/or wireless communication links 132 to communicate with one or more remote servers 145. The access points 101 may perform communication configuration, adjustment, and/or scheduling for communication with the devices 115, or may operate under the control of a controller. In various examples, the access points 101 may communicate—either directly or indirectly (e.g., through network 130)—with each other over a second set of wired and/or wireless communication links 134. Access points 101 may communicate with a back end server (such as the remote servers 145)—directly and/or indirectly—using the first set of one or more communication links 132.

The apparatuses 105 may wirelessly communicate with the devices 115 via one or more antennas. Each of the apparatuses 105 may provide communication coverage for a respective geographic coverage area 110. In some examples, apparatuses 105 may be referred to as and/or include a control device, a control panel, a base transceiver station, a radio base station, an access point, a radio transceiver, or some other suitable terminology. The geographic coverage area 110 for an apparatus 105 may be divided into sectors making up only a portion of the coverage area. The communications system 100 may include apparatuses 105 of different types. There may be overlapping geographic coverage areas 110 for one or more different parameters, including different technologies, features, subscriber preferences, hardware, software, technology, and/or methods. For example, each apparatus 105 may be related to one or more discrete structures (e.g., a home, a business) and each of the one more discrete structures may be related to one or more discrete areas. In other examples, multiple apparatuses 105 may be related to the same one or more discrete structures (e.g., multiple apparatuses relating to a home and/or a business complex).

The access points 101 may wirelessly communicate with the devices 115 via one or more antennas. Each of the access points 101 may provide communication coverage for a respective geographic coverage area 110. In some examples, access points 101 may be referred to as and/or include an antenna, a base transceiver station, a radio base station, a radio transceiver, or some other suitable terminology. The geographic coverage area 110 for an apparatus 105 may be divided into sectors making up only a portion of the coverage area. Access points 101 may comprise one or more devices configured for and/or capable of wireless and/or wired communications.

In some embodiments, access points 101 may comprise multiple devices, such as radios, configured for and/or capable of wireless communications. In some embodiments, access points 101 may include multiple radio devices positioned in various directions that may or may not have overlapping coverage area. In some embodiments, access points 101 may be configured for and/or capable of wireless narrow beam communications. In some embodiments, these narrow beam communications may communicate over a certain area, such as one or more geographic cover areas 110, based on a communication angle of the access point. For example, in some embodiments, the narrow beam communication may be a communication that is less than the maximum degree capability value of a radio transceiver element of the access point 101. So, if a radio transceiver element may communicate over a 90 degree area then the narrow beam communication may be less than 90 degrees.

In other embodiments, a narrow beam communication may be smaller and may only include one or more focused wireless communication. In some embodiments, these narrow beam communications may include a wireless transmission signal less than 45 degrees, less than 35 degrees, less than 30 degrees, less than 20 degrees, less than 10 degrees, less than 5 degrees, more than 135 degrees, more than 145 degrees, more than 150 degrees, more than 160 degrees, more than 170 degrees, more than 175 degrees, less than 180 degrees, and/or more than 1 degree.

In some embodiments, a narrow beam communication signal within a range between 25 degrees and 5 degrees may be appropriately sized to enable sufficient coverage for multiple structures (depending on the geographic area and/or topography data, among other things), including but not limited to multiple customer devices (e.g., CPEs, customer devices). In some embodiments, a narrow beam communication signal within a range between 20 degrees and 10 degrees may be appropriately sized to enable sufficient coverage for multiple structures (depending on the geographic area and/or topography data, among other things), including but not limited to multiple customer devices (e.g., CPEs, customer devices).

With respect to FIG. 1, each access point 101 may be configured for and/or capable of wireless narrow beam communications with respect to devices within one or more geographic coverage areas 110. In some embodiments, each access point 101 may be configured for and/or capable of wireless narrow beam communications with respect to devices within only one geographic coverage area 110. In some embodiments, one or more access points 101 may be configured for and/or capable of wireless narrow beam communications with respect to devices in multiple geographic coverage areas 110, while one or more other access points 101 may be configured for and/or capable of wireless narrow beam communications with respect to devices in one geographic area.

The communications system 100 may include access points 101 of different types. There may be overlapping geographic coverage areas 110 for one or more different parameters, characteristics, and/or factors, including different technologies, features, subscriber preferences, hardware, software, technology, and/or methods. For example, each access point 101 may be related to one or more discrete structures (e.g., a home, a business), including a grouping of structures and/or a subset and each of the one more discrete structures may be related to one or more discrete areas. In other examples, multiple access points 101 may be related to the same one or more discrete structures (e.g., multiple apparatuses relating to a home and/or a business complex), grouping of structures, and/or a subset of.

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The apparatuses 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. A device 115 and/or a sensor 150 may be able to communicate through one or more wired and/or wireless connections with various components such as apparatuses, control panels, base stations, and/or network equipment (e.g., servers, wireless communication points, etc.) and/or the like.

The communication links 125 shown in communications system 100 may include uplink (UL) transmissions from a device 115 to an apparatus 105, and/or downlink (DL) transmissions, from an apparatus 105 to a device 115. Access points 101 may also include communication links 125 and may include transmissions and/or downlink transmissions. Other system components and/or elements may also may also include communication links 125 and may include transmissions and/or downlink transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to wireless communications generally and/or security and/or automation systems.

In some embodiments of communications system 100, apparatuses 105, access points 101, and/or devices 115 may include one or more antennas for employing antenna diversity schemes to improve communication quality and reliability between apparatuses 105, access points 101, and/or devices 115, among others. Additionally or alternatively, apparatuses 105, access points 101, and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the apparatus 105 and/or access points 101 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections, among others. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Figure 2:
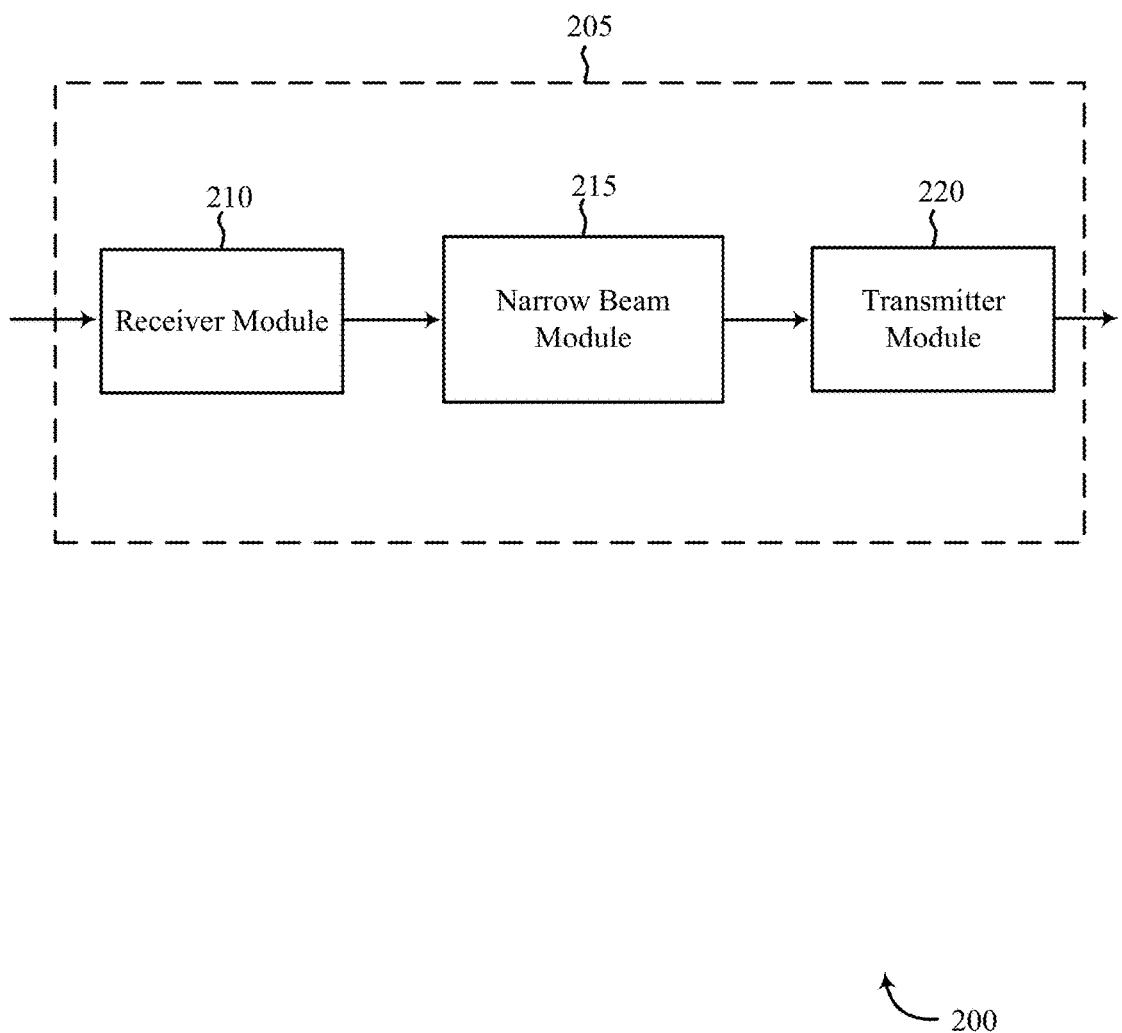
FIG. 2 shows a block diagram of a device relating to wireless networking and communication systems, in accordance with various aspects of this disclosure.

FIG. 2 shows a block diagram 200 of an apparatus 205 for use in electronic communication, in accordance with various aspects of this disclosure. In some embodiments, the apparatus 205 may be an example of one or more aspects of an apparatus 105 described with reference to FIG. 1 and others. In some embodiments, the apparatus 205 may be an example of one or more aspects of an access point 101 described with reference to FIG. 1 and others. In some embodiments, the apparatus 205 may be an example of one or more aspects of a remote server 145 described with reference to FIG. 1 and others. In some embodiments, the apparatus 205 may be an example of one or more aspects of a device 115 described with reference to FIG. 1 and others. In some embodiments, the apparatus 205 may be an example of a control panel, an access point, a remote server, a customer premises equipment device, and/or a device. The apparatus 205 may include a receiver module 210, a narrow beam module 215, and/or a transmitter module 220, among other things. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to and/or capable of receiving information through wired and/or wireless connections from and/or relating to one or more components of system 100, including but not limited to access points 101, apparatuses 105, and/or device 115, remote servers 145, and/or information from apparatus 205 (including from another module such as narrow beam module 215), among others. Information may be passed on to the narrow beam module 215, the transmitter module 220, and/or to other components of the apparatus 205 and/or a system, such as system 100, among others.

The narrow beam module 215 may perform one or more operations relating to an apparatus, an access point, a device and/or a remote server (including but not limited to apparatus 205, access point 101, device 115, remoter server 145), that may be configured to, relate to, and/or capable of performing narrow beam communications. The operations, features, and methods relating to narrow beam module 215 may be performed regardless of whether the system includes a narrow beam communications device and/or which system component may perform a narrow beam communication. References to a narrow beam apparatus 205 and/or a narrow beam module 215 (and variations) include all functions, features, and capabilities disclosed with respect to other apparatuses, access points, remote servers, and devices, unless otherwise specifically noted.

The transmitter module 220 may transmit the one or more signals received from other components of the apparatus 205 and/or other components of any system, such as system 100. The transmitter module 220 may transmit geographic data, topography data, data that has an action performed on it, summaries, analyses, determinations, initiations, operations, instructions, alerts, statuses, errors, and/or other information relating to one or more system components, network design and/or organization, and/or narrow beam communication, among other things. In some examples, the transmitter module 220 may be collocated with the receiver module 210 in a transceiver module. In other examples, the transmitter module 220 may not be collocated with the receiver module 210 in a transceiver module.

Figure 3:
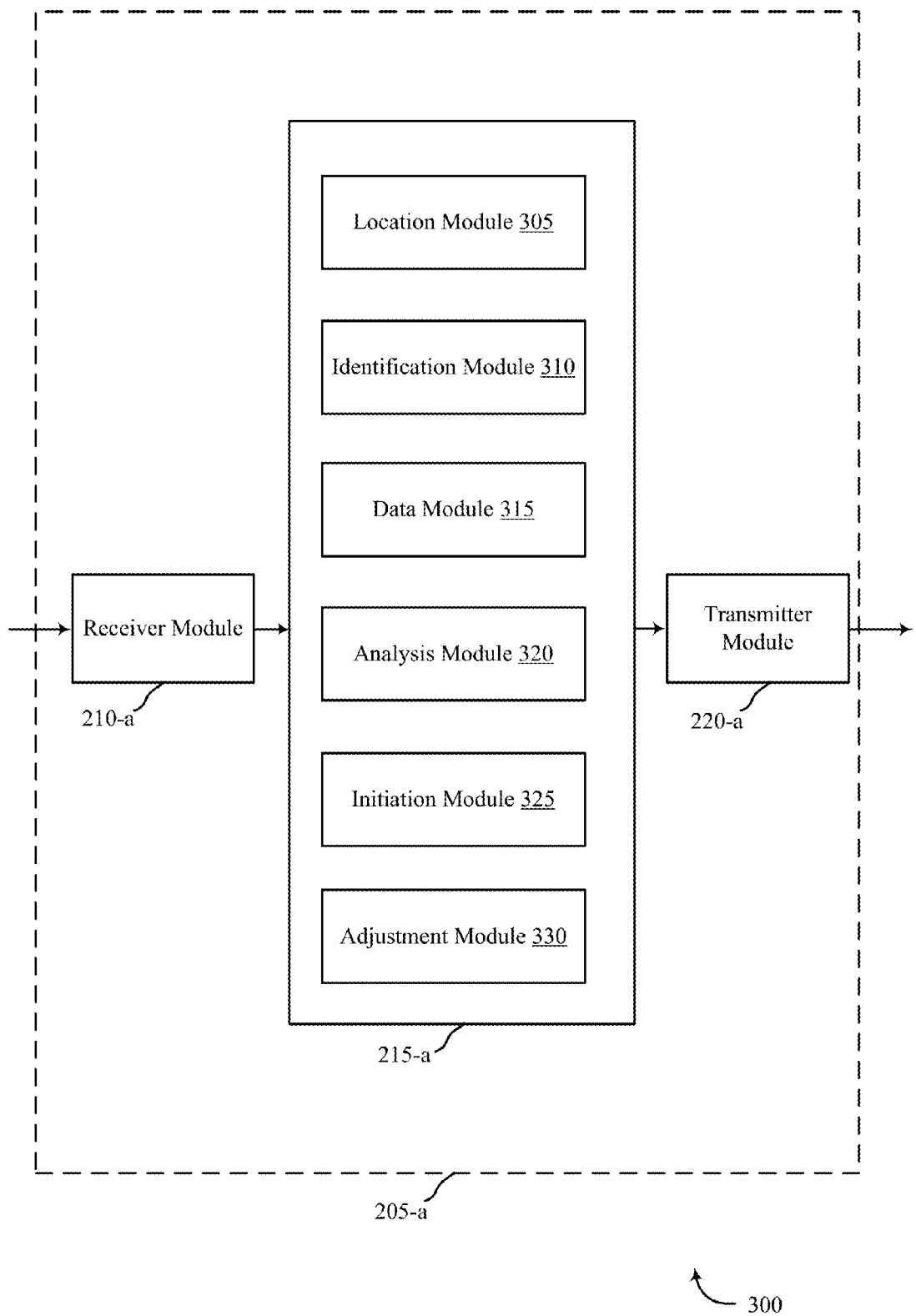
FIG. 3 shows a block diagram of a device relating to wireless networking and communication systems, in accordance with various aspects of this disclosure.

FIG. 3 shows a block diagram 300 of an apparatus 205-a for use in wireless communication, in accordance with various examples. The apparatus 205-a may be an example of one or more aspects of an apparatus 105 described with reference to FIG. 1 and others. It may be an example of an apparatus 205 described with reference to FIG. 2. The apparatus 205-a may include a receiver module 210-a, a narrow beam module 215-a, and/or a transmitter module 220-a, which may be examples of the corresponding modules of apparatus 205. The apparatus 205-a may include a processor. Each of these components may be in communication with each other directly and/or indirectly. The narrow beam module 215-a may include but is not limited to a location module 305, identification module 310, data module 315, analysis module 320, initiation module 325, and/or adjustment module 330, among others. The receiver module 210-a and the transmitter module 220-a may perform the functions of the receiver module 210 and the transmitter module 220 of FIG. 2, respectively.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, narrow beam module 215-a may include a location module 305. Location module 305 may perform one or more operations relating to location information and/or other information, among other things. Location module 305 may perform one or more operations relating to one or more other modules of narrow beam module 215-a, including but not limited to identification module 310, data module 315, analysis module 320, and/or adjustment module 330, among others. Location module 305 may perform one or more operations relating to location information, including but not limited to locations, relative locations, and/or possible locations of structures, streets, sidewalks, access points, backhaul lines, customer premises equipment (CPE), customer devices such as smart phones, and/or other things.

Among other things, location module 305 may perform one or more operations relating to past locations, current locations, potential future locations, theoretical locations, area locations, area location subsets, one or more relative locations, and/or projected locations, modeled locations, other location types, and/or some combination, among other things. In some embodiments, location module 305 may perform one or more operations, including but not limited to assessing, receiving, sorting, grouping, tracking, organizing, categorizing, placing, ordering, tracing, calculating, computing, estimating, and/or some combination, among others. In some embodiments identification module 310 may perform one or more operations discussed with respect to other modules of apparatus 205-a and/or narrow beam module 215, alone and/or in combination, with the apparatus and/or the one or more other modules.

In some embodiments, narrow beam module 215-a may include an identification module 310. Identification module 310 may perform one or more operations relating to location information, geographic information, data, devices, and/or communications, among other things. Identification module 310 may perform one or more operations relating to one or more other modules of narrow beam module 215-a, including but not limited to location module 305, data module 315, analysis module 320, and/or adjustment module 330, among others.

Identification module 310 may perform one or more operations relating to location information and/or topography data, including but not limited to locations of structures, streets, sidewalks, access points, backhaul lines, customer premises equipment (CPE), customer devices such as smart phones and/or data, including but not limited to data relating to states, cities, municipalities, structures, streets, satellites, lidar (which may provide prime locations of one or more system components, such as access points, and/or lines of sight between one or more locations as compared to satellite and/or other data), unmanned drones, sidewalks, elevations, terrain, orienteering information, connections and/or points between two or more objects and/or locations, vegetation (e.g., trees, bushes), property lines, city planning documents, zoning regulations, organization of one or more objects, neighborhoods, regulations, covenants, ordinances, physical characteristics (e.g., reflectivity, height, width, depth), traffic direction, structure spacing, subsets of one or more areas, relative positions of structures and/or other objects, access points, backhaul lines, customer premises equipment (CPE), customer devices such as smart phones, some combination, etc.

Among other things, identification module 310 may perform one or more operations relating to past locations and/or data, current locations and/or data, potential future locations and/or data, theoretical locations and/or data, area locations and/or data, area location subsets and/or data, one or more relative locations and/or data, projected locations and/or data, modeled locations and/or data, other location types and/or data, and/or combinations of some and/or all of these, among other things. In some embodiments, identification module 310 may perform one or more operations, including but not limited to identifying, classifying, recognizing, detecting, distinguishing, characterizing, discovering, distinguishing, associating, connecting, relating, assessing, receiving, calculating, computing, estimating, and/or some combination, among others. In some embodiments identification module 310 may perform one or more operations discussed with respect to other modules of apparatus 205-a and/or narrow beam module 215, alone and/or in combination, with the apparatus and/or the one or more other modules.

In some embodiments, identification may include identifying one or more user devices. This identifying may include identifying one or more user devices relating to one or more access points based at least in part on other operations, including but not limited to analysis performed by analysis module 320. In some embodiments, identification may include identifying one or more access points. This identifying may be based at least in part on other operations, including but not limited to analysis performed by analysis module 320.

In some embodiments, narrow beam module 215-*a* may include a data module 315. Data module 315 may perform one or more operations relating to geographic, topographic, and/or other data, among other things. Data module 315 may perform one or more operations relating to geographic, topographic, and/or other data, including but not limited to data relating to states, cities, municipalities, structures, streets, satellites, lidar, user devices, sidewalks, elevations, terrain, orienteering information, connections and/or points between two or more objects and/or locations, vegetation (e.g., trees, bushes), property lines, zoning regulations, organization of one or more objects, neighborhoods, regulations, covenants, ordinances, physical characteristics (e.g., reflectivity, height, width, depth), traffic direction, structure spacing, subsets of one or more areas, relative positions of structures and/or other objects, access points, backhaul lines, customer premises equipment (CPE), customer devices such as smart phones, some combination, and/or other information. Among other things, data module 315 may perform one or more operations of relating to past data, current data, potential future data, theoretical data, calculated data, area data, area data subsets, one or more relative data sets, and/or projected data, modeled data, other types, and/or some combination, among other things. In some embodiments, data module 315 may perform one or more operations, including but not limited to assessing, receiving, sorting, grouping, tracking, organizing, categorizing, placing, ordering, tracing, calculating, computing, estimating, and/or some combination, among others. In some embodiments identification module 310 may perform one or more operations discussed with respect to other modules of apparatus 205-*a* and/or narrow beam module 215, alone and/or in combination, with the apparatus and/or the one or more other modules.

In some embodiments, narrow beam module 215-*a* may include an analysis module 320. Analysis module 320 may perform one or more operations relating location information, data, devices, and/or communications, narrow beam communications, among other things. Analysis module 320 may perform one or more operations relating to one or more other modules of narrow beam module 215-*a*, including but not limited to location module 305, identification module 310, and/or data module 315, among others. Analysis module 320 may perform one or more operations relating to location information, including but not limited to locations of structures, streets, sidewalks, access points, backhaul lines, customer premises equipment (CPE), customer devices such as smart phones and/or data, including but not limited to data relating to states, cities, municipalities, structures, streets, satellites, lidar, sidewalks, elevations, terrain, orienteering information, connections and/or points between two or more objects and/or locations, vegetation (e.g., trees, bushes), property lines, zoning regulations, organization of one or more objects, neighborhoods, regulations, covenants, ordinances, physical characteristics (e.g., reflectivity, height, width, depth), traffic direction, structure spacing, subsets of one or more areas, relative positions of structures and/or other objects, access points, backhaul lines, customer premises equipment (CPE), customer devices such as smart phones, network performance information including but not limited to notifications related to one or components and/or elements, characteristics, parameters, actual data, interference data, calculated data, projected data, channel information, and/or some combination, etc.

Among other things, analysis module 320 may perform one or more operations relating to past locations and/or data, current locations and/or data, potential future locations and/or data, theoretical locations and/or data, area locations and/or data, area location subsets and/or data, one or more relative locations and/or data, projected locations and/or data, modeled locations and/or data, other location types and/or data, relative height of one or more points in and/or relating to a geographic area, data relating to one or more trends, correlations, patterns, designs, models, organizations, configurations, and/or combinations of some and/or all of these, among other things. In some embodiments, analysis module 320 may perform one or more operations, including but not limited to analyzing, examining, evaluating, comparing, calculating, correlating, linking, matching, relating, contrasting, assembling, identifying, detecting, distinguishing, characterizing, discovering, associating, connecting, assessing, receiving, computing, estimating, and/or some combination, among others. In some embodiments, analysis module 320 may perform one or more operations discussed with respect to other modules of apparatus 205-*a* and/or narrow beam module 215, alone and/or in combination, with the apparatus and/or the one or more other modules.

In some embodiments, narrow beam module 215-*a* may include an initiation module 325. Initiation module 325 may perform one or more operations information and/or data, related to and/or separate from other modules of narrow beam module 215-*a*. Initiation module 325 may perform one or more operations because of, based in whole and/or in part on, related to, and/or separate from one or more other modules of narrow beam module 215-*a*. For example, initiation module 325 may initiate one or more operations relating to one or more components based on one or more operations related to analysis module 320.

As an example, if analysis module 320 analyzes geographic area and/or topography data and determines one or more results, initiation module may perform one or more operations based at least in part on one or more results. Initiation module 325 may perform the one or more initiation actions automatically, after a period of time, based on user preferences, based on system performance, based on performance relating to one or more devices within a system, based on one or more constraints, and/or some combination, among other things. For example, based at least in part on analysis module 320 analyzing geographic area and/or topography data and determining one or more results, initiation module 325 may initiate one or more actions relating to one or more components, including but not limited to an access point, a CPE, a backhaul link, a remote server, an apparatus, a control panel, and/or some combination, among others. Unless otherwise noted "based on," includes based solely on and based at least in part on, as used in this disclosure. Examples of initiated actions may include but are not limited to rotations, movements, orientations, modifications, frequency modifications, changing locations, modifying operations, adding and/or omitting one or more steps, alternating, calculations, adapting, varying (including randomly and/or pseudo-randomly), initiating, cancelling, pausing, powering on, powering off, communicating, capturing, enabling, restarting, some combination, and/or other functions.

In some embodiments, narrow beam module 215-*a* may include an adjustment module 330. In some embodiments, adjustment module 330 may adjust one or more operations related to one or more components of a system, such as system 100. For example, adjustment module 330 may adjust the operation of an access point (among other components elements, and/or devices), including adjusting a frequency, a channel, a field of view, a strength of a narrow beam communication, a communication direction, a relative communication direction, a power, a communication width (broader and/or narrower), a horizontal narrow beam communication characteristic, a vertical narrow beam communication characteristic, a location of a component, a relative location of a components, a performance parameter, a performance characteristic, a time, an output, a protocol, a sensitivity, a predetermined threshold level, a scheduled monitoring, a capturing of different and/or additional data, and/or other operations. Adjustment module 330 may additionally or alternatively modify the operation of multiple components (e.g., access points, devices, apparatuses, remote servers) and/or elements, based on a single input and/or multiple inputs. Adjustment module 330 may additionally or alternatively modify the operation of one or more modules and/or algorithms relating to one or more methods and/or operations that relate to one or more components (e.g., access points, devices, apparatuses, remote servers) and/or elements, based on a single input and/or multiple inputs. For example, adjustment module 330 may adjust the operation of a first access point 101, a device 115, and a second access point 101 based on data relating to the first access point 101, a device 115, and a second access point 101 (among others), including but not limited to channel use, performance, alerts, instructions, and/or other information. In some embodiments, a performance indicator may include a performance parameter and/or a performance characteristic.

In some embodiments, adjustment may include adjusting a direction. As an example, adjusting a direction of one or more system components and/or elements may be based at least in part on a location of user device, locations of multiple user devices, and/or other information, including but not limited to other locations.

In some embodiments, narrow beam module 215-a (and associated system components) may function as fixed-direction apparatuses. Based on an installation direction, topography data, a projected direction, and/or other information, a narrow beam module 215-a (and associated system components) may perform one or more operations in a given direction and may not be dynamically adjustable. In some embodiments, based on installation and/or a projected direction, a narrow beam module 215-a may perform one or more operations in one and only one set direction. In some embodiments, based on installation and/or a projected direction, a narrow beam module 215-a may perform one or more operations in one set direction relative to another different narrow beam module 215-a (e.g., an access point), a signal inhibitor, a backhaul lines, a customer premises equipment (CPE), some combination of these, and/or other information.

In some embodiments, at least some of the operations relating to apparatus 205-a, including but not limited to operations relating to narrow beam module 215-a, may be performed in one or more layers of open system interconnection. In some embodiments, at least some of the operations relating to apparatus 205-a, including but not limited to operations relating to narrow beam module 215-a, may be performed in the lower and/or the upper MAC layers, among others.

Figure 4:
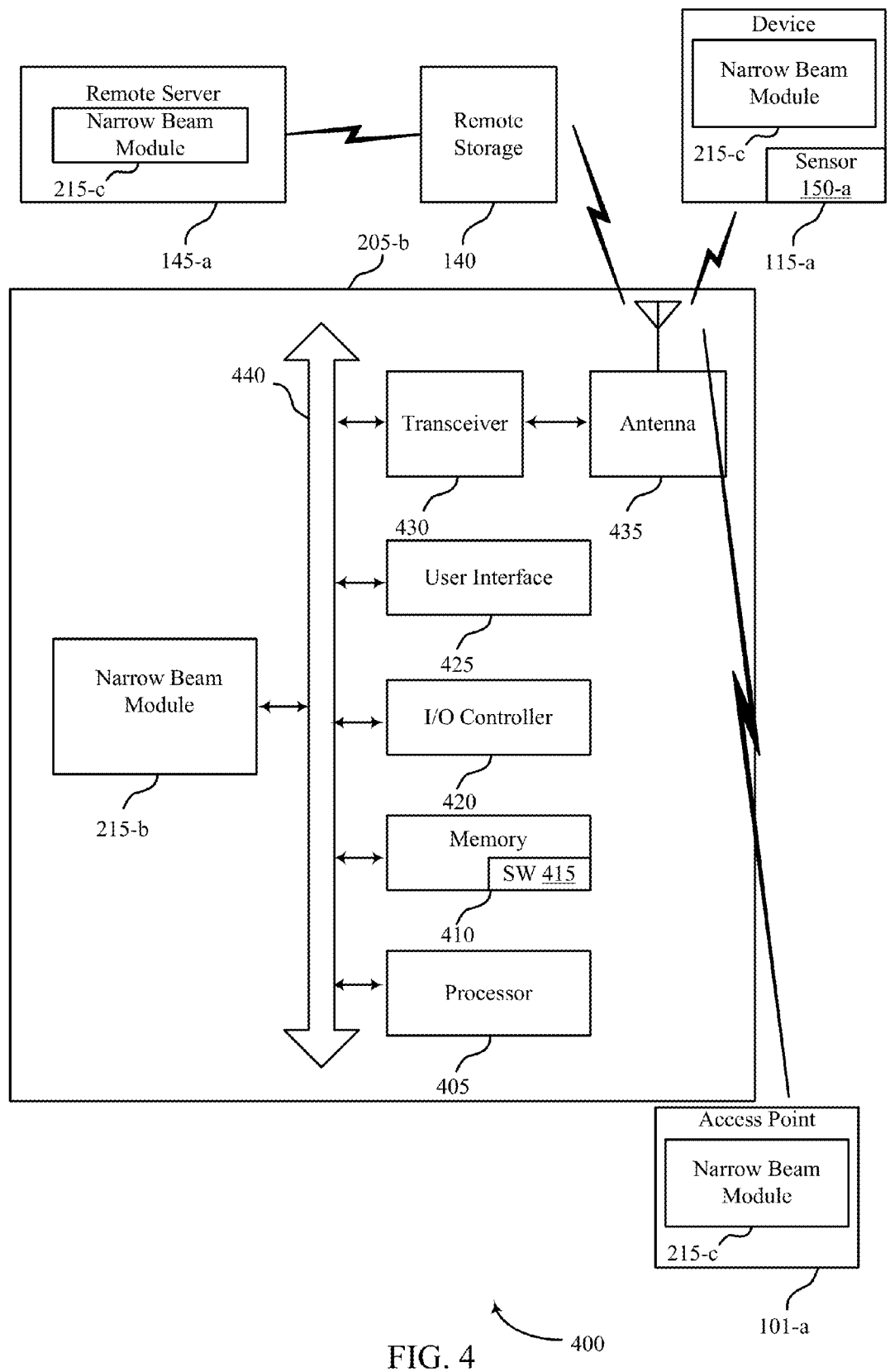
FIG. 4 shows a block diagram of apparatuses relating to wireless networking and communication systems, in accordance with various aspects of this disclosure.

FIG. 4 shows a system 400 for use in wireless communications, including narrow beam networking systems, in accordance with various examples. System 400 may include an apparatus 205-b, which may be an example of the apparatuses 105 of FIG. 1. Apparatus 205-b may also be an example of one or more aspects of apparatuses 205 and/or 205-a of FIGS. 2 and 3.

Apparatus 205-b may include narrow beam module 215-b, among others, which may be an example of narrow beam module 215 described with reference to FIG. 2 and others. Apparatus 205-b may include narrow beam module 215-b, among others, which may be an example of narrow beam module 215-a described with reference to FIG. 3 and others. In some embodiments, the terms an apparatus and a control device are used synonymously.

Apparatus 205-b may also include components for bi-directional voice and data communications including components for transmitting communications and components for receiving communications. For example, apparatus 205-b may communicate bi-directionally with one or more of device 115-a, one or more sensors 150-a, remote storage 140, and/or remote server 145-a, which may be an example of the remote server of FIG. 1. This bi-directional communication may be direct (e.g., apparatus 205-b communicating directly with remote storage 140) or indirect (e.g., apparatus 205-b communicating indirectly with remote server 145-a through remote storage 140).

The narrow beam module 215-b may perform one or more operations relating narrow beam communications, including wireless narrow beam network organization and/or communication based at least in part on geographic area data, topography data, information relating to wireless communication and/or network organization, location information, identification operations, analysis operations, initiation operations, and/or adjustment operations as described above with reference to FIGS. 1-3. For example, narrow beam module 215-b may perform one or more operations relating to topography data and/or geographic area data, analyzing at least one of the topography data and the geographic area data, and identifying one or more lines of sight and/or performing one or more other operations, such as adjustment, as described with reference to FIGS. 1-3 and others, among others. In some embodiments, identifying one or more lines of sight may be based at least in part on determining a line of sight having certain characteristics, including current horizontal clearance (e.g., 3 meters), current vertical clearance (e.g., 3 meters), a current window of clearance (of one or more shapes such as a circle, an oval, a rectangle, etc.), calculated and/or projected horizontal clearance, calculated and/or projected vertical clearance, a calculated and/or projected window of clearance, some combination, and/or other characteristics.

As shown in FIG. 4, apparatus 205-b may include one or more elements including elements 405, 410, 415, 425, 430, 435, 440, and/or others. Other devices, including, but not limited to, devices 115-a, access points, 101-a, and/or remote servers 145-a, may include one or more of elements 405, 410, 415, 425, 430, 435, and/or 440, among others. Thus, specific devices, including narrow beam access points 101 may include one or more elements described with respect to apparatus 205-b, relating to FIG. 4 and/or otherwise. In some embodiments, access points 101 and/or remote servers 145-a (among others) may perform some and/or all of the operations and/or functions discussed for apparatus 205-b, and the access points 101 and/or remote servers 145-a (or others) may function independent of an apparatus 205-b. In such independent embodiments, the access points 101 (or devices, such as devices 115) may operate and/or communicate directly with remote storage 140 and/or remote server 145-*a*, among other elements.

Apparatus 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote storage 140, and/or remote server 145-*a*. The transceiver module 430 may include a modem to modulate the packets and provide the modulated packets to the one or more antennas 435 for transmission, and to demodulate packets received from the one or more antennas 435. While a control panel, an apparatus, or a control device (e.g., 205-*b*) may include a single antenna 435, the control panel, the apparatus, or the control device may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 145-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., operations relating to locations, identifying actions, operations relating to data, analyzing actions, initiating one or more operations, adjusting operations, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the narrow beam module 215-*b* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-*b*) may include a single antenna 435, the control panel or control device (e.g., 205-*b*) may have multiple antennas 435 capable of concurrently transmitting and/or receiving multiple wireless transmissions.

Figure 5:
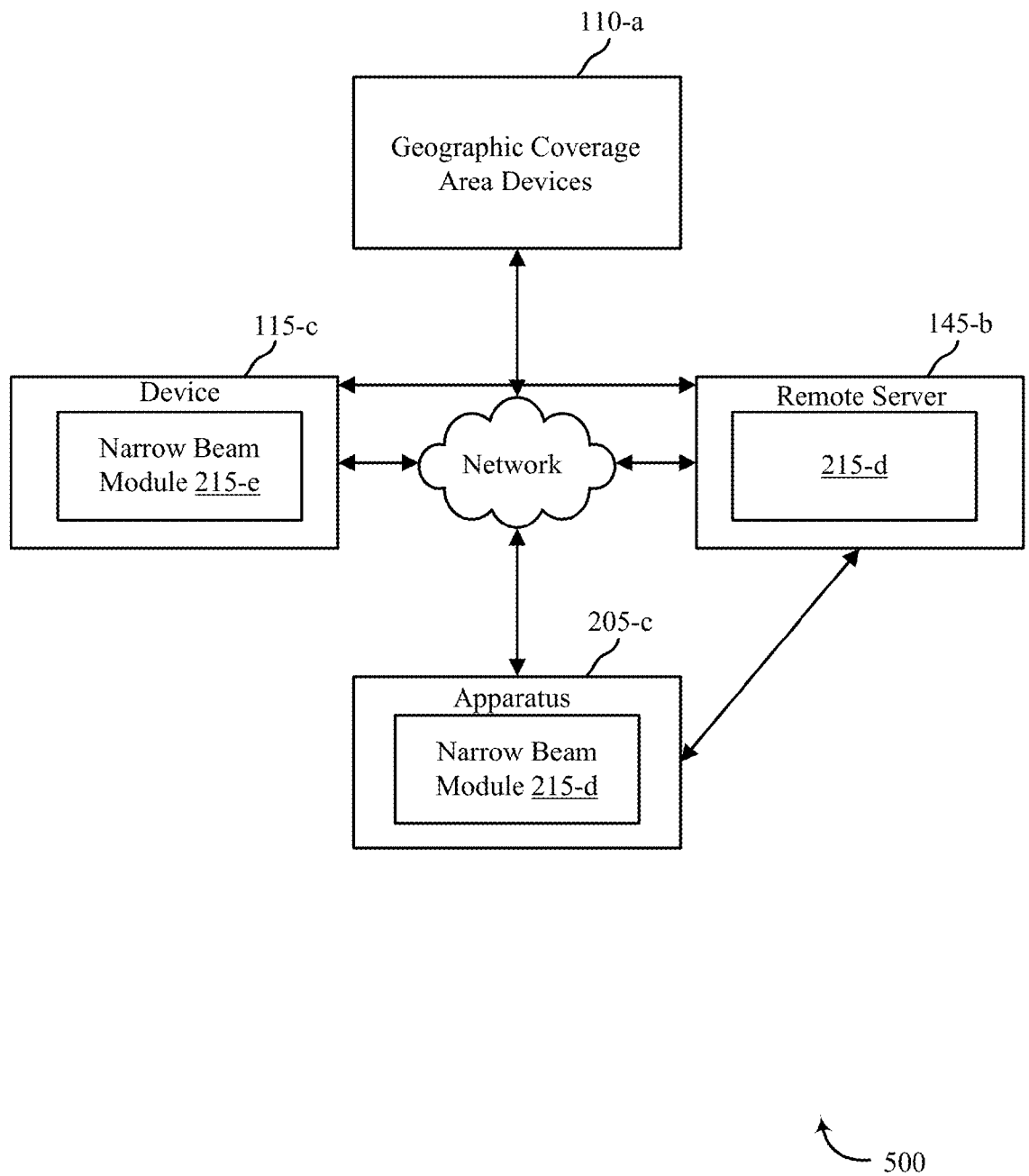
FIG. 5 shows a block diagram relating to wireless networking and communication systems, in accordance with various aspects of this disclosure.

FIG. 5 illustrates an example of a system 500 in accordance with various aspects of the disclosure. The system 500 may include apparatus 205-*c*, device 115-*c*, remote server 145-*b*, and one or more devices within geographic coverage area 110-*a*, network 130, and/or other components. In some embodiments, these one or more components may communicate with each other using similar, different, exactly the same, and/or other variations of different signals. In some embodiments, apparatus 205-*c* may be example of an access point and/or another device (e.g., device 115), among other things.

In some embodiments, apparatus 205-*c* may communicate directly and/or indirectly with other components and/or elements via wired and/or wireless connections. Indirect communication may include communicating with one or more devices via network 130, which may be a wired and/or a wireless network. Additionally and/or alternatively, indirect communication may include communicating with one component and/or elements through one or more other components and/or elements. For example, apparatus 205-*c* may communicate with remote server 145-*b* through device 115-*c*. In some embodiments, this indirect communication may be facilitated by narrow beam module 215-*e* and/or 215-*d*. In some embodiments, each system component may be capable of and/or configured to communicate with one or more other devices.

In some embodiments, multiple system components, such as devices 115-*c* and/or apparatuses 205-*c* may communicate with other similar and/or difference components that may be separated by a distance. Then, in some embodiments, after a certain parameter, threshold, limit, and/or other constraint is met (e.g., the number of powered components communicating, a calculated distance and/or from an origin component to another component), that component device may communicate with an apparatus 205-*c* and/or any other component, such as a remote server 145-*b*. In some embodiments, a device 115-*c* may not require all and/or any of the elements of a narrow beam module 215-*e* to function and/or may function based on including different modules. As another example, apparatus 205-*c* may communicate with device 115-*c* through one or more devices within geographic coverage area 110-*a*.

In some embodiments, network 130 may comprise a wireless network only. In some embodiments, network 130 may comprise a wired network only. In some embodiments, network 130 may comprise a wireless and a wired network. In some embodiments, one or more components may communicate with a first other component using a first method of wireless communication (e.g., non-narrow beam communication, non-millimeter wave communication), while the one or more components may communicate with a second other component using a second method of wireless communication (e.g., narrow beam communication, millimeter wave communication).

Figure 6:
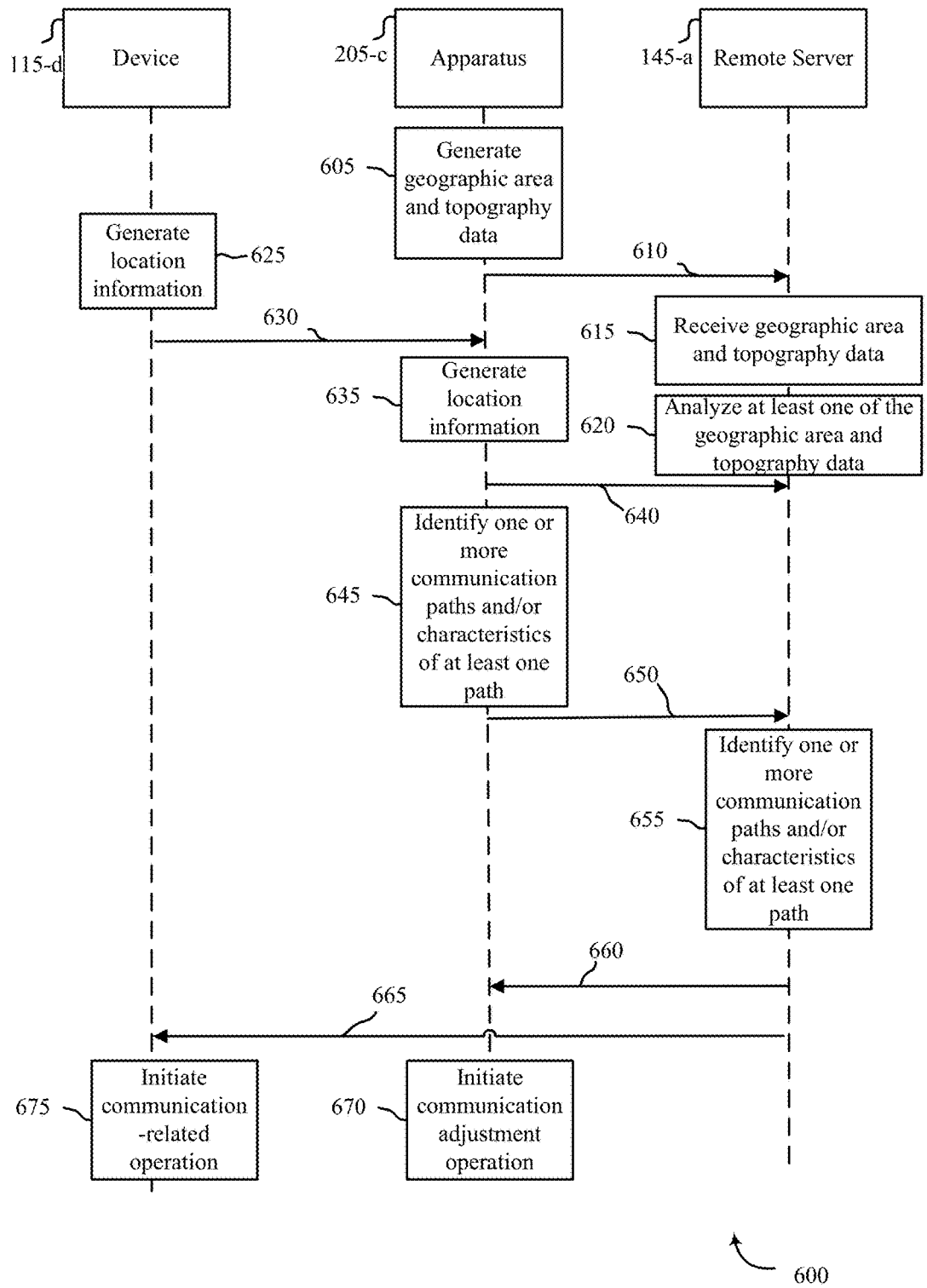
FIG. 6 shows a flow chart illustrating exemplary methods relating to wireless networking and communication systems, in accordance with various aspects of this disclosure.

FIG. 6 illustrates an example of a system 600 in accordance with various aspects of the disclosure. The system 600 may include device 115-*d*, apparatus 205-*c*, remote server 145-*a*, network 130, and/or other components. In some embodiments, these one or more components may communicate with each using similar, different, exactly the same, and/or other variations of different signals and/or methods.

In some embodiments, apparatus 205-*c* may generate geographic area and/or topography data, as shown by block 605. Additionally and/or alternatively, in some embodiments, apparatus 205-*c* may receive geographic area (and/or perform one or more operations) and/or topography data from another source, such as a remote server 145-*a*, remote storage 140, device 115-*d*, and/or other components of a system (e.g., system 100), among others. In some embodiments, the geographic area data may relate to a geographic boundary, a region, a section, one or more subsets of a larger area (e.g., a state, a city), some combination, and/or other information. In some embodiments, topography data may include but is not limited to locations of structures, streets, sidewalks, access points, backhaul lines, customer premises equipment (CPE), customer devices such as smart phones and/or data, including but not limited to data relating to states, cities, municipalities, structures, streets, satellites, lidar, sidewalks, elevations, terrain, orienteering information, connections and/or points between two or more objects and/or locations, vegetation (e.g., trees, bushes), property lines, city planning documents, material types, object density, object mobility including based on weather, zoning regulations, organization of one or more objects, neighborhoods, regulations, covenants, ordinances, physical characteristics (e.g., reflectivity, height, width, depth), traffic direction, structure spacing, subsets of one or more areas, relative positions of structures and/or other objects, access points, backhaul lines, customer premises equipment (CPE), customer devices such as smart phones, data relating to one or more sensors (e.g., sensor 150) such as those relating to proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs, and/or some combination, etc.

As shown by arrow 610, apparatus 205-*c* may communicate with apparatus 205-*c* (transmitting, receiving, and/or transmitting and receiving).

In some embodiments, remote server 145-*a* may receive geographic area information and/or topography information (and/or perform one or more operations), as shown by block 615. In some embodiments this receiving may include receiving information generated by an apparatus (e.g., apparatus 205-*c*) and/or another device (e.g., device 115-*d*) and/or may include both generating one or more types of data itself (via remote server 145-*a*), and/or receiving other data from one or more other components. In some embodiments, remote server 145-*a* may analyze (and/or perform one or more operations) at least one of the geographic area and/or topography information, as shown by block 620. In some embodiments this analysis may include performing analysis of one or more data types and/or one or more information types, including analyzing information as described for analysis module 320 discussed with respect to FIG. 3.

In some embodiments, device 115-*d* may generate location information (and/or perform one or more operations), as shown by block 625. Additionally and/or alternatively, in some embodiments, device 115-*d* may receive location information from another source, such as a remote server 145-*a*, another device 115, remote storage 140, and/or other components of a system (e.g., system 100), among others.

As shown by arrow 630, device 115-*d* may communicate with apparatus 205-*c* (transmitting, receiving, and/or transmitting and receiving).

In some embodiments, apparatus 205-*c* may generate location information (and/or perform one or more operations), as shown by block 635. Additionally and/or alternatively, in some embodiments, apparatus 205-*c* may receive location information from another source, such as a remote server 145-*a*, another device 115, remote storage 140, and/or other components of a system (e.g., system 100), among others.

As shown by arrow 640, apparatus 205-c may communicate with remote server 145-a (transmitting, receiving, and/or transmitting and receiving).

In some embodiments, apparatus 205-c may identify one or more communication paths and/or characteristics of at least one communication path (and/or perform one or more operations), as shown in block 645. This identifying may, in some embodiments, include one or more operations relating to identification module 310 described with respect to FIG. 3. This identifying may include but is not limited to identifying a line of sight, a path width, a path length, vertical characteristics relating to a path, horizontal characteristics relating to a path, alternative paths, relative direction of one or more paths to each other and/or other components, relative length of one or more paths to each other and/or other components, other relative characteristics of one or more paths to each other and/or other components, and/or some combination, among other things. In some embodiments, this identifying may be based at least in part on one or more operations performed in FIG. 6, discussed in this disclosure (including with respect to FIGS. 1-5), and/or other operations. For example, the identifying in block 645 may be performed based at least in part on the location information relating to block 625 and/or 635, the analysis relating to block 620, and/or the geographic and/or topography data relating to block 605, among other things.

As shown by arrow 650, apparatus 205-c may communicate with remote server 145-a (transmitting, receiving, and/or transmitting and receiving).

In some embodiments, remote server 145-a may identify one or more communication paths and/or characteristics of at least one communication path (and/or perform one or more operations), as shown in block 655. This identifying may, in some embodiments, include one or more operations relating to identification module 310 described with respect to FIG. 3, among other things. This identifying may include but is not limited to identifying a line of sight, a path width, a path length, vertical characteristics relating to a path, horizontal characteristics relating to a path, alternative paths, relative direction of one or more paths to each other and/or other components, relative length of one or more paths to each other and/or other components, and/or other relative characteristics of one or more paths to each other and/or other components, among other things. In some embodiments, this identifying may be based at least in part on one or more operations performed in FIG. 6, discussed in this disclosure (including with respect to FIGS. 1-5), and/or other operations.

For example, the identifying in block 655 may be performed based at least in part on the location information relating to block 625 and/or 635, the analysis relating to block 620, the identifying relating to block 645, and/or the geographic and/or topography data relating to block 605, among other things.

As shown by arrow 660, remote server 145-a may communicate with apparatus 205-c (transmitting, receiving, and/or transmitting and receiving). In some embodiments, this communication may include communication based at least in part on the identifying in block 655 and/or other operations.

As shown by arrow 665, remote server 145-a may communicate with device 115-d (transmitting, receiving, and/or transmitting and receiving). In some embodiments, this communication may include communication based at least in part on the identifying in block 655 and/or other operations.

In some embodiments, apparatus 205-c may initiate one or more communication adjustment operations (and/or perform one or more operations), as shown in block 670. In some embodiments, this communication adjustment operation may include communication based at least in part on the identifying in block 655, the analyzing operation performed in block 620, and/or other operations. This adjustment operation may, in some embodiments, include one or more operations relating to adjustment module 330 described with respect to FIG. 3, among other things.

In some embodiments, device 115-d may initiate one or more communication related operations (and/or perform one or more operations), as shown in block 675. In some embodiments, this communication-related operation may include communication based at least in part on the identifying in block 655, the analyzing operation performed in block 620, and/or other operations. This communication related operation may, in some embodiments, include one or more operations relating to initiation module 325 described with respect to FIG. 3, among other things.

Any and/or all of these communications between the one or more components may be performed via network 130, which may include wired and/or wireless connections.

Though FIG. 6 displays operations and function relating to geographic area data, topography data, location information and communications paths, the communications, function, and other information may relate to these data and/or information types, and/or other related information.

With respect to FIG. 6 and the other FIGs. of this disclosure, the embodiments shown should not be taken as limiting unless specifically noted. For example, though FIG. 6 shows device 115-d communicating with apparatus 205-c (e.g., arrow 630) and remote server 145-a communicating with apparatus 205-c (e.g., arrows 610, 660), any of these communications and/or functions may include communicating between only apparatus 205-d, apparatus 205-d and remote server 145-a, only remote server 145-a, and/or apparatus 205-d and remote server 145-a and one or more other devices, among others. Moreover, any functions described with respect to one or more components shown in FIG. 6 may be performed by and/or relate to different components (e.g., those operations performed by apparatus 205-d may be performed by remote server 145-a, and vice versa).

Figure 7:
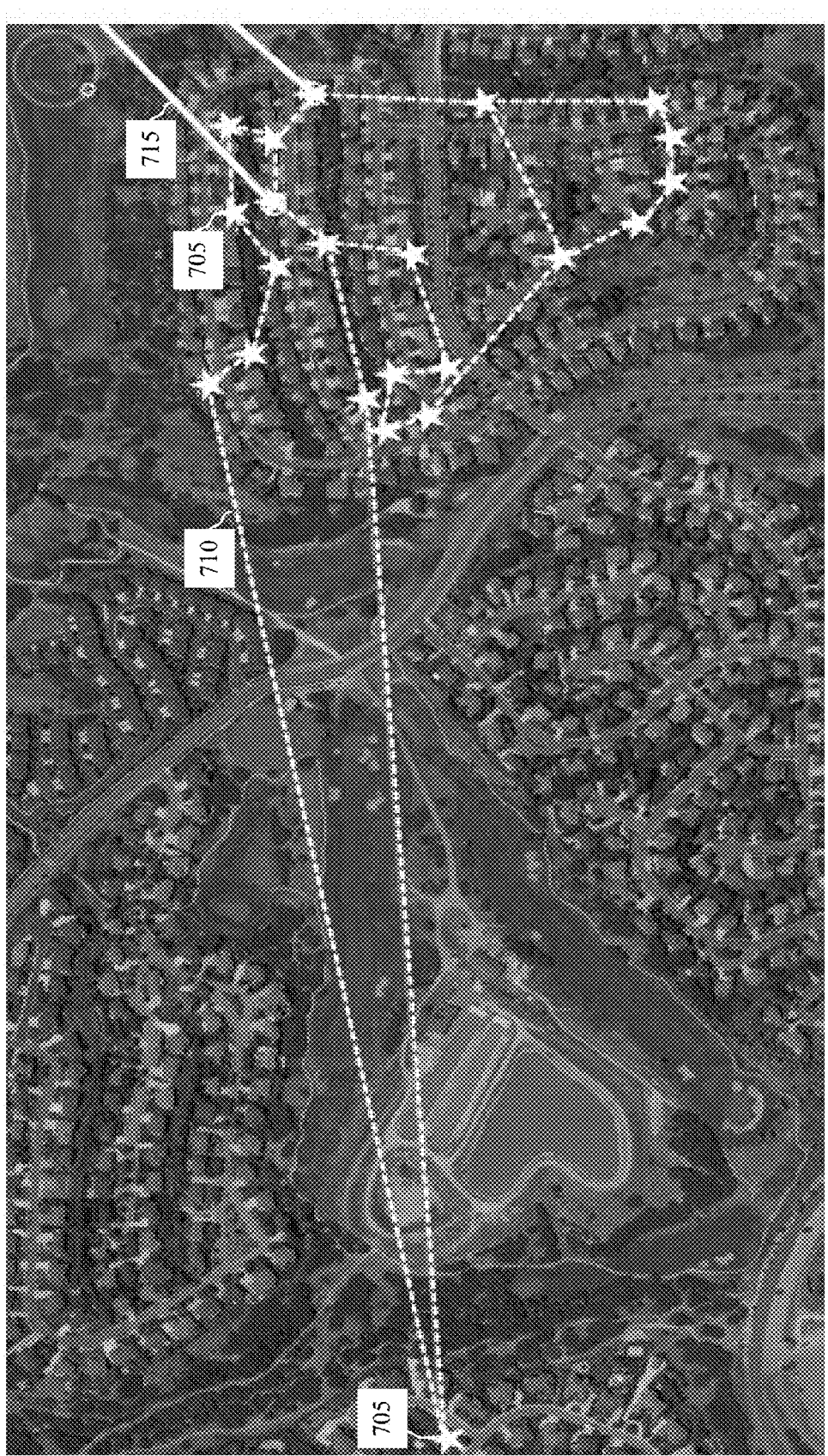
FIG. 7 shows designs illustrating exemplary methods relating to wireless networking and communication systems, in accordance with various aspects of this disclosure.

FIG. 7 illustrates examples of system 700 in accordance with the present systems, apparatuses, and methods. In some embodiments, one or more components of system 700 may include the same, similar and/or different functions, characteristics, performance, and/or other information relating to other systems, access points, devices, apparatuses, remote servers, and/or modules related to this disclosure, including relating to FIGS. 1-6 and 8-16. In some embodiments, system 700 may include access points 705 (depicted as stars), communication lines 710 (dotted white lines), backhaul connections 715 (solid white lines), and/or other components.

In some embodiments, access points 705 may include the same, similar and/or different access points having one or more of the same, similar, and/or different capabilities and/or functions. In some embodiments, access points 705 may facilitate, permit, enable, route, and/or otherwise influence and/or modify communications, including wired and/or wireless communications.

In some embodiments, communication lines 710 may include only wired communication lines. In some embodiments, communication lines 710 may include only wireless communication lines. In some embodiments, communication lines 710 may include some combination of wired and wireless communication lines.

In some embodiments, certain communication lines may be wired communication lines, while others may be wireless. For example, in FIG. 7 one or more of the longest communication lines 710 (extending to the far left side) may be wired communication lines. In some examples, these wired communication lines may facilitate high networking speeds without significant loss over long distances.

Additionally and/or alternatively, in some embodiments, certain communication lines may be wireless communication lines. For example, in FIG. 7 one or more of the longest communication lines 710 (extending to the far left side) may be wireless communication lines. In some examples, these wireless communication lines may facilitate high networking speeds without significant loss over long distances, using one or more elements relating to the present systems and methods, among others.

In some embodiments, one or more communication lines 710 may include non-millimeter wave communications. In some embodiments, the communication lines 710 may only include non-millimeter wave communications. In some embodiments, these non-millimeter wave communications may include communications within the 5 GHz band, among others. Unless otherwise specifically noted, discussion of any wireless, non-millimeter wave communications may apply to any frequency or band in the non-millimeter wave range. In some embodiments, using non-millimeter wave communication may facilitate relatively long range communications between one or more access points and/or other system components, as depicted in FIG. 7 by the communication lines 710 across the golf course connecting the access points 705.

In some embodiments, one or more communication lines 710 may include millimeter wave communications. In some embodiments, the communication lines 710 may only include millimeter wave communications. In some embodiments, these millimeter wave communications may include communications within the 60 GHz band, among others. Unless otherwise specifically noted, discussion of any wireless, millimeter wave communications may apply to any frequency or band in the millimeter wave range. In some embodiments, using millimeter wave communication may facilitate relatively long range communications based on one or more lines of sight between one or more access points and/or other system components, as depicted in FIG. 7 by the communication lines 710 across the golf course connecting the access points 705.

In some embodiments, communication lines 710 having distances greater than a predetermined threshold may include using wired and/or non-millimeter wave communication lines to limit signal attenuation. In some embodiments, this predetermined threshold may be based at least in part on the quality and cost of the related components, where the predetermined distance may be less than 1 kilometer, less than 500 meters, less than 250 m, and/or some other amount. Communication lines 710 having distances less than the predetermined threshold may include millimeter wave communication lines based at least in part on lines of sight between one or more system components, such as access points, CPEs, and/or backhaul connections, etc. Alternatively, however, communication lines having distances greater than the predetermined threshold may still employ millimeter wave communication based at least in part on lines of sight between one or more system components.

In some embodiments, system 700 may include multiple communication lines 710 that provide alternatives communication routes from one or more system components, such as access points 705. For example, a first access point 705 may be configured to and/or capable of utilizing one or more communication lines 710. These one or more communication lines may include one or more wired connections, non-millimeter wave connections, millimeter wave connections, some combination of at least some of these, and/or other communication types. Alternatively and/or additionally, these one or more communication lines may include only millimeter wave connections, with at least one of these millimeter wave connections based at least in part on one or more lines of sight. The one or more lines of sight may relate to the first access point, other access points, and/or other system components.

In some embodiments, system 700 may include one or more backhaul connections 715. In some embodiments, the backhaul connection 715 may serve as an intermediate link between communication lines 710 and/or access points 705 (e.g., within one or more prescribed geographic areas) and the main network, with one or more of these components facilitating communication routing, uplinking, downlinking, and/or other functions.

In some embodiments, backhaul connection 715 may serve as the connection (direct and/or indirect) between the main network and one or more system 700 components. In some embodiments, backhaul connection 715 may include only wired connections. In some embodiments, backhaul connection 715 may include only wireless connections. In some embodiments, backhaul connection 715 may include only millimeter wave connections. In some embodiments, backhaul connection 715 may include only non-millimeter wave connections. In some embodiments, backhaul connection 715 may include only microwave wave connections. In some embodiments, backhaul connection 715 may include only 60 GHz band connections.

In some embodiments, backhaul connection 715 may include wired and wireless connections. In some embodiments, whether backhaul connection 715 includes wired and/or wireless connections may be based on one or more parameters, characteristics, analyses, identifications, determinations, and/or some combination, among other things. For example, whether backhaul connection 715 includes wired and/or wireless connections may be based on one or more operations performed by narrow beam module 215. As an example, whether backhaul connection 715 includes wired and/or wireless connections may be based on the existence of and/or other characteristics relating to millimeter and/or non-millimeter wave communications (e.g., distance between two or more components, line of sight, relative positions of other system components). In some embodiments, backhaul connection 715 may include wired connections (e.g., fiber optic, others). In some embodiments, system 700 may include one or more backhaul connections 715 that include a millimeter wave communication connection configured to provide at least gigabyte uplink and/or downlink speeds.

Figure 8:
FIG. 8 shows designs illustrating exemplary methods relating to wireless networking and communication systems, in accordance with various aspects of this disclosure.

FIG. 8 illustrates examples of system 800 in accordance with the present systems, apparatuses, and methods. In some embodiments, one or more components of system 800 may include the same, similar and/or different functions, characteristics, performance, and/or other information relating to other system, access points, devices, apparatuses, remote servers, and/or modules related to this disclosure, including relating to FIGS. 1-7 and 9-16. In some embodiments, system 700 may include access points 705 (depicted as stars), communication lines 710 (crosshatched), backhaul connections 715 (striped), narrow beam communication signals (e.g., 720, 725, 730, and 735), and/or other components. In some embodiments, the narrow beam communication signals may include one or more of the same, similar, and/or different properties, functions, characteristics, parameters, and/or other information.

Related to FIG. 8, the narrow beam communications signals shown serve only as examples. In the examples shown, narrow beam communication signal 720 (large diamond checker), narrow beam communication signal 725 (small square checker), narrow beam communication signal 730 (small waves), and narrow beam communication signal 735 (large waves) merely serve as representations to visualize different narrow beam communication signals having various differences and/or similarities.

In some embodiments, system 800 may include a geographic area. In some embodiments, the area shown by FIG. 8 may include an example of a geographic area. In other embodiments, the area shown by FIG. 8 may include an example of multiple geographic areas that may each be subsets of the areas shown. In some embodiments, one or more geographic areas may be non-overlapping and/or partially overlapping. In some embodiments, a geographic area may be identified based on one or more characteristics relating to the geographic area. In some embodiments, a geographic area may be identified irrespective of any characteristic relating to the geographic area.

As merely examples, these characteristics may include, but are not limited to, a relative size of an area (e.g., acreage size, total size), a number of structures, a distance related to two or more points (e.g., between structures, streets, foliage, trees, homes, businesses, potential access point locations, relationship to one or more backhaul connections), a named subset (e.g., a neighborhood, a home development, an office complex), orientation of one or more elements (e.g., structures, streets, elements relating to one or more cardinal directions), comparative and/or relative characteristics of a first geographic area vs. a second geographic area, and/or other information.

In some embodiments, one or more components of a system, such as system 800, may receive, generate, and/or otherwise collect information relating to a geographic area. This information may come from only components of a system (e.g., system 800), only from components outside a system, from user devices and/or CPEs, some combination, and/or other sources. For example, geographic information may be received from satellite data, such as satellite image data. As another example, geographic information may be received from aerial vehicle data, such as plane and/or drone image data. In some embodiments, the geographic area may include one or more areas of current wireless communication activity (of and/or relating to a certain company, other companies, and/or some combination, among other things), one or more theoretical areas of theoretical wireless communication activity, and/or one or more areas of expansion for a particular carrier and/or company where they may have zero or only some customers within the geographic area.

In some embodiments, one or more components of a system, such as system 800, may receive, generate, and/or otherwise collect topography data. This data may come from only components of a system (e.g., system 800), only from components outside a system including user devices, and/or CPE, and/or some combination. For example, topography data may be received from satellite data, such as satellite image data. As another example, topography data may be received from aerial vehicle data, such as plane and/or drone image data. As another example, topography data may be received from one or more system components and/or elements, such as sensors 150, access points 101, remote server, 145, some combination, and/or others.

In some embodiments, examples of topography data may include, but are not limited to, elevations, locations, textures, colors, shades, shapes, patterns, trends, orientations, shadowing, sizes, reflectivity, structure type, data relating to one or more geographic areas, etc. In addition, in some embodiments, topography data may include, but is not limited to, changes, differences, comparisons, determinations, and/or identifications relating to relative characteristics of one or more objects within a geographic area, including actual objects present (and/or previously present), and/or projected objects relating to potential system and/or other designs.

In some embodiments, one or more operations may be performed on the geographic area information, the topography data, and/or other related information. For example, one or more system components (e.g., access point, remote server, etc.) may analyze at least one of the geographic area information, the topography data, and/or other information. In some embodiments, the analysis may relate only to the geographic area information. In some embodiments, the analysis may relate only to the topography data. In some embodiments, the analysis may include performing one or more operations relating to narrow beam module 215, including, but not limited to, operations relating to analysis module 320.

In some embodiments, one or more components of a system (e.g., system 800) may perform one or more identifications. For example, identifications may relate to positioning, direction, characteristics, calculations, and/or other parameters relating to wireless networking and one or more geographic areas.

As another example, the identifications may include identifying one or more lines of sight. In some embodiments, these lines of sight may include current, projected, calculated, alternative, and/or other lines of sight. In some embodiments, these lines of sight may relate to or be specific to one or more backhaul connections, access points (including radios), CPEs, structures, narrow beam communication signals, and/or other information. In some embodiments, these lines of sight may be based at least in part on a predetermined amount relative to one or more other characteristics relating one or more backhaul connections, access points (including radios), CPEs, structures, narrow beam communications signals, other lines of sight, and/or other information.

In some embodiments, access points 705 may include one or more elements configured to and/or capable of initiating and/or performing narrow beam communications. These narrow beam communication signals (e.g., 720, 725, 730, and 735) may each be the same, similar, and/or different from each other. In some embodiments, characteristics and/or parameters of these narrow beam communication signals (e.g., 720, 725, 730, and 735) may be the same, similar, and/or different from each other. In some embodiments, the narrow beam communication signals (e.g., 720, 725, 730, and 735) may include one or more various lengths, width, shapes (e.g., triangle, geometric, polygon, asymmetric, amorphous), frequencies, channels, orientations, organizations, strengths, relationships to one or more components (e.g., access points, backhaul connections, CPEs, user devices), relationships to one or more lines of sight, relationships to one or more communication lines 710, some combination of these, and/or other characteristics, among others.

In some embodiments, one or more characteristics and/or parameters of narrow beam communication signals (e.g., 720, 725, 730, and 735) may influence one or more identifications, analyses, initiations, adjustment, and/or other operations relating to one or more system components. In some embodiments, geographic area information may influence the narrow beam communication signals (e.g., 720, 725, 730, and 735), including one or more one or more characteristics and/or parameters of identifications, analyses, initiations, adjustment, and/or other operations relating to one or more system components.

In some embodiments, topography data may influence the narrow beam communication signals (e.g., 720, 725, 730, and 735), including one or more one or more characteristics and/or parameters of identifications, analyses, initiations, adjustment, and/or other operations relating to one or more system components. As merely an example, an absolute and/or a relative position of one or more elements may influence a narrow beam communication signal. The relative position may include a position of a structure, a signal inhibitor, an access point, a relative orientation of an access point, a relative direction of another narrow beam communication signal, some combination, and/or other components and/or elements.

As another example, as shown on FIG. 8 the relative width and/or length of a narrow beam communication signal (e.g., 720, 725, 730, and 735) may be influenced by the location of one or more signal inhibitors (among other things). These signal inhibitors may include any component and/or element that inhibits a narrow beam communication signal (including millimeter wave, non-millimeter wave, and/or others), including but not limited to structures, poles, hills, mountains, foliage (e.g., trees, bushes, brush, vines, etc.), combinations of these, and/or other things.

In some embodiments, the present system and methods facilitate narrow beam communication despite the presence and/or relative position of one or more signal inhibitors. For example, by choosing a location of an access point 705, a direction of a narrow beam communication signal (e.g., 720, 725, 730, and 735), a backhaul connection 715, and/or some other component and/or element, the present system and methods may utilize the locations of signal inhibitors to increase performance and reduce interference and other typical network shortcomings. In some embodiments, increased performance and reduced interference (among other things) may be based on and/or related to one or more operations performed by a system (e.g., operations relating to narrow beam module 215), including determining a line of sight and/or other network organizational and/or operating characteristics.

As an example, one or more location of an access points may be determined based on minimizing the amount of channel interference. This interference minimization (among other advantages) may be based at least in part on the location of signal inhibitors, one or more characteristics and/or parameters of narrow beam communication signals (e.g., operating channel, signal strength, communication direction), one or more lines of sight relating to one or more system components and/or elements (e.g., access points, narrow beam communication signals), some combination, and/or other information and/or factors.

As an example, a first narrow beam communication signal 720 may be oriented approximately eastward and extend from a first access point toward a second access point. But, based at least in part on the presence of a signal inhibitor below the first narrow beam communication signal 720, a second narrow beam communication signal 720 (e.g., also oriented eastward) may be positioned to extend from the substantially the same longitude position while not interfering with the first narrow beam communication signal 720. The present system and method thus facilitate channel reuse and limit channel interference even within close communication deployments, including but not limited to those shown in FIG. 8.

As another example, a first narrow beam communication signal 720 may be oriented approximately eastward and extend from a first access point toward a second access point. But, based at least in part on the presence of a signal inhibitor at the east end of the first narrow beam communication signal 720, a second narrow beam communication signal 720 (e.g., oriented southward) may be positioned to extend from the substantially the same latitude position while not interfering with the first narrow beam communication signal 720. The present system and method thus facilitate channel reuse and limit channel interference even within close communication deployments, including but not limited to those shown in FIG. 8.

In some embodiments, systems and method for wireless network organization and/or operation relating to narrow beam communication are disclosed. In some embodiments, systems and methods may include performing one or more operations relating to a geographic area (including one or more subsets of a larger area), performing one or more operations relating to topography data, performing one or more operations relating to one or more line of sight paths. The present systems and methods may be utilized for determining, maximizing, and/or minimizing one or more locations, performance parameters and/or characteristics, costs, user coverages, relationship to one or more components, combinations, and/or other information.

In some embodiments, the present system and methods may include identifying, determining, and/or calculating one or more locations of and/or relating to communication lines 710, access points 705, narrow beam communication signals (e.g., 720, 725, 730, and 735), backhaul connections 715, combinations, and/or other related components and/or elements. In some embodiments, based at least in part on the location, performance, function, and/or capability (among other things) of one or more system components, one or more operations may be performed, including identifying and/or determining one or more locations, orientations, characteristics, and/or parameters relating to narrow beam communications. In some embodiments, the one or more locations, orientations, characteristics, and/or parameters relating to narrow beam communications may be related to and/or relative to one or more locations of devices, CPEs, apparatuses, and/or access points, among other things.

In some embodiments, two or more narrow beam communication signals may be oriented with respect to one another to produce advantages and results. In some embodiments, the present system and methods may utilize two or more narrow beam communication signals that are substantially parallel, substantially orthogonal, approximately parallel, approximately orthogonal, parallel, orthogonal, within 3 degrees of being parallel or orthogonal, within 5 degrees of being parallel or orthogonal, within 10 degrees of being parallel or orthogonal, within 15 degrees of being parallel or orthogonal, within 20 degrees of being parallel or orthogonal, within 30 degrees of being parallel or orthogonal, within a predetermined orientation range (e.g., 5 to 10 degrees different, 10 to 20 degrees different, 80 to 90 degrees different, 170 to 180 degrees different, less than 45 degrees different, etc.), relative to an angle between a longitudinal axis of each narrow beam communication signal, some combination, and/or other orientations.

In some embodiments, access points 705 may perform one or more narrow beam communications, including projecting narrow beam communication signals (e.g., 720, 725, 730, and 735). In some embodiments, each of these narrow beam communication signals may only be non-millimeter wave communication signals (e.g., 5 GHz). These narrow beam, non-millimeter wave signal provide advantages of other non-narrow beam communication signals by reducing amount of interference that occurs based on the number of access points, the proximity of the access points, the one or more channels of the competing access points, and/or other problems that may occur while still allow for the non-millimeter wave communication signals to relate to lines of sight and/or signal inhibitor location.

In some embodiments, each of these narrow beam communication signals may only be millimeter wave communication signals (e.g., 60 GHz). These narrow beam, millimeter wave signal provide advantages by increasing the uplink and downlink speeds over certain distances, reducing the amount of interference that occurs based on the number of access points, reducing the amount of interference that occurs based on the proximity of the access points, reducing the amount of interference that occurs based on the one or more channels of the competing access points, and/or other problems that may occur.

In some embodiments, each of these narrow beam communication signals may be millimeter and/or non-millimeter narrow beam wave communication signals (e.g., 5 GHz, 13 GHz, 60 GHz, etc.). Moreover, by designing networks based on the present systems and methods in areas with many signal inhibitors, the signal inhibitors may limit the amount of signal interference, lobe overlap based on narrow beam communication signals, and facilitate increased system, network, and/or component performance.

For example, as shown in FIG. 8, where at least some of the narrow beam communication signals are more parallel and/or more orthogonal then the presence of signal inhibitors, including but not limited to foliage, by design the network to utilize millimeter wave communications based on the location of the signal inhibitors the system (including individual components and collectively) will exhibit increased performance. In addition, networks designed in accordance with the present systems and methods also permit using larger channel sizes even with a large number of access points based at least in part on the relative positioning of the access points, narrow beam communication signals, lines of sight, and/or customer-related equipment, among other things.

For example, in some embodiments, due to the lacking channel interference based on the orientation and direction of the narrow beam communication signals, instead of using narrower channel sizes (e.g., 40 megahertz, 30 megahertz, 20 megahertz), the present system and method facilitate using channel sizes of 80 megahertz or more, which provides additional advantages.

In some embodiments, at least some components and/or elements of a system, including but not limited to a remote server 145 and/or narrow beam module 215-*a*, may perform one or more operations, such as utilizing a specially-designed algorithm, relating to designing, testing, identifying, determining, and/or adjusting a theoretical and/or an actual network. In some embodiments, one or more system components and/or elements may analyze and/or perform one or more other operations relating to geographic area information and/or topography data.

In some embodiments, the present system and methods may include one or more modes for discovering, saving, analyzing, and/or adjusting information relating to a geographic area. In some embodiments, this information may include current organization (positioned structures), projected organization (based on plans, analysis, and/or other information), current and/or projected component and element location (e.g., location of access points), current and/or projected narrow beam communication characteristics and/or parameters (e.g., location, orientation, width, length, channel, related devices, etc.), current and/or projected CPE and/or other devices, some combination, and/or other information.

As one example, one or more devices may discover and store the locations and orientations of the access points and each narrow beam communication signal (actual and/or capability) as related to CPE and other devices. Then based one or more network characteristics, network parameters, and/or other information one or more devices may be adjusted based on the discovered information and/or other related information, such as geographic area information and/or topography data.

In some embodiments, two or more narrow beam communication signals may both transmit to one or more system components (e.g., a CPE within a structure). Based at least in part on the CPE's reception and utilization of one of the narrow beam communication signals, one or more adjustments may be made. In some embodiments, these one or more adjustments may include adjusting one or more of a direction, a channel, a parameter, and/or a characteristic of the unused narrow beam communication signal, among other things. This adjustment may be based at least in part on a channel state indicator relating to the CPE, one or more narrow beam communications, and/or an access point. This channel state indicator may indicate which channel (and/or narrow beam communication signal) the CPE (and/or another system component and/or elements) has received and/or is receiving, and may facilitate one or more adjustments based at least in part on this indication.

In some embodiments, the present system and methods may include utilizing a femtocell chip (and/or a similar device) within and/or related to one or more system components and/or elements. In some embodiments, one or more access points 705 may incorporate a femtocell chip that may facilitate and/or enables communication using one or more wireless frequency bands (including but not limited to millimeter wave bands, a 60 GHz band, a non-millimeter wave band, a 5 GHz band, a 2.4 GHz band, and/or other frequency bands).

In some embodiments, the one or more access points 705 using a femtocell chip may effectively act as a small cell neighborhood connection. Moreover, in some embodiments, each home or business sufficiently related to the femtocell access point 705 may communicate using this femtocell and/or may itself utilize a femtocell within the home to facilitate various types of communication between devices associated with a home and/or one or more femtocells (in the home, a related home, and/or an access point 705).

In some embodiments, one operation and/or step may include identifying and/or determining one or more lines of sight within one or more geographic areas. This operation and/or step may be based at least in part on geographic area information, topography data, location data, performance characteristics and/or parameters, some combination, and/or other information. In some embodiments, one operation and/or step may include identifying and/or determining, including but not limited to calculating, how to connect one or more lines of sight with each other and/or one or more components and/or elements with the fewest amount of lines of sight, communication paths, access points, backhaul connections, some combination, and/or other information.

In some embodiments, one operation and/or step may include identifying and/or determining, including but not limited to calculating, how a potential and/or an actual network design may perform under certain conditions, including determining how each access point and/or customer-related device (e.g., CPE, user devices, etc.) may perform, individually and/or collectively. In some embodiments one or more of these operations and/or steps may be based on a preferred customer, an existing customer, an existing system, an existing system component and/or element, a relative location of an existing system, system component, and/or system element to another system, system component, and/or system element, imposed constraints based on one or more performance characteristics and/or parameters, some combination, and/or other information.

In some embodiments, information received by, captured by, collected by, and/or generated by one or more system components may influence the narrow beam communication signals (e.g., 720, 725, 730, and 735), including one or more characteristics and/or parameters of identifications, analyses, initiations, adjustment, and/or other operations relating to one or more system components.

In some embodiments, at least one narrow beam communication signal (e.g., 720, 725, 730, and 735) may at least partially overlap with one or more system components and/or elements, including an access point, 705, a communication line 710, at least one other narrow beam communication signal (e.g., 720, 725, 730, and 735), some combination, and/or other elements. In some embodiments, the present systems and methods may include performing one or more operations based at least in part on the overlap.

In some embodiments, the present systems and method may include performing one or more operations, including but not limited to identifying one or more line of sight paths. These lines of sight paths may include lines of sight. In some embodiments, these line of sight paths may be based at least in part on a predetermined amount. In some embodiments, this predetermined amount may include but is not limited to a degree value, an orientation, a direction, a distance, a linear distance, one or more narrow beam communication signal characteristics and/or parameters, a relative degree value, a relative orientation, a relative direction, a relative distance, a relative linear distance, one or more relative narrow beam communication signal characteristics and/or parameters, some combination, and/or other amounts.

In some embodiments, this predetermined amount may include but is not limited to a relative relationship between two or more system components, organizational characteristics, and/or other information. For example, the relative relationship may relate to and/or be between a first line of sight path and a second line of sight path. In some embodiments, these line of sight paths may be independent of, dependent on, and/or related to one or more other system components and/or elements, geographic area information, topography data, narrow beam communication characteristics and/or parameters, some combination, and/or other information.

In some embodiments, a line of sight may be related to one or more locations. These locations may, in some examples, relate to locations within a geographic area, relate to topography data, projected and/or actual system components and/or elements (e.g., access points, narrow beam communication signals), some combination, and/or other information.

In some embodiments, the present systems and method may include performing one or more operations, including but not limited to making one or more adjustments. In some embodiments, an adjustment may include adjusting a narrow beam communication signal, another system component and/or element (e.g., an access point, a remote server, a device), a step in a design process and/or algorithm, some combination, and/or one or more other elements. This adjustment of a narrow beam communication single may include but is not limited to adjusting the signal a predetermined amount.

In some embodiments, multiple adjustments may be performed. These multiple adjustments may relate to a narrow beam communication signal, another system component and/or element (e.g., an access point, a remote server, a device), a step in a design process and/or algorithm, some combination, and/or one or more other elements. In some embodiments, adjusting a direction of one or more system elements may be related to an adjustment of one or more other system elements.

For example, adjusting a direction of a first access point may be based at least in part on an adjustment of a direction of a second access point. This relative and/or multiple adjustment in accordance with the present systems and methods may facilitate enhanced wireless communications performance by increasing uplink and/or downlink speeds, decreasing interference and/or adverse performance, and other advantages.

Figure 9:
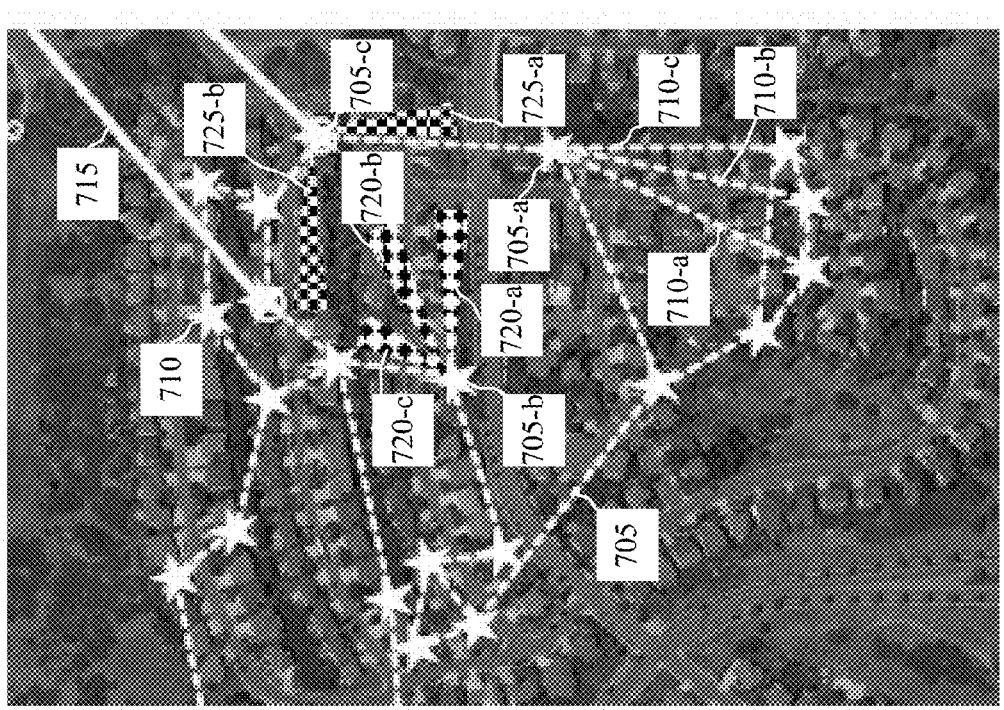
FIG. 9 shows designs illustrating exemplary methods relating to wireless networking and communication systems, in accordance with various aspects of this disclosure.

FIG. 9 illustrates examples of system 900 in accordance with the present systems, apparatuses, and methods. In some embodiments, one or more components of system 900 may include the same, similar and/or different functions, characteristics, performance, and/or other information relating to other systems, access points, devices, apparatuses, remote servers, and/or modules related to this disclosure, including relating to FIGS. 1-8 and 10-16. In some embodiments, system 900 may include access points 705 (depicted as stars), communication lines 710 (white dotted lines), backhaul connections 715 (solid white lines), narrow beam communication signals (e.g., 720-a, 720-b, 720-c, 725-a, and 725-b), and/or other components. In some embodiments, the narrow beam communication signals may include one or more of the same, similar, and/or different properties, functions, characteristics, parameters, and/or other information.

In some embodiments, one or components and/or elements of system 900 may be adjusted based on least in part on various criteria. In some embodiments, one or more adjustments may relate to one or more functions of narrow beam module 215-a discussed with respect to FIG. 3, including but not limited to adjustment module 330. FIG. 9 provides examples of the present systems and methods including analysis of potential components and/or elements, organization of potential components and/or elements, applications of potential components and/or elements, calculations related to potential components and/or elements, combinations, and/or other operations. FIG. 9 also provides examples of the present systems and methods including analysis of actual components and/or elements, organization of actual components and/or elements, applications of actual components and/or elements, calculations related to actual components and/or elements, combinations, and/or other operations.

In some embodiments, based at least in part on one or more operations, the present systems and methods may include adjusting one or more operating components, elements, characteristics, parameters, some combination, and/or other things. For example, in some embodiments, based at least in part on lines of sight from one access point 705 to one of three other access points 705, one or more lines of sight (e.g., communication lines 710-a, 710-b, and/or 710-c) may be weighed, evaluated, analyzed, identified, and/or determined, including deciding on a line of sight that will facilitate system performance, including at a current time, at a future time, based on a range of time, some combination, and/or other information.

In some embodiments, based at least in part on one or more operations, in theory and/or in actual practice access point 705-a may be adjusted based on one or more communication lines, such as communication lines 710-c, 710-b, and/or 710-a. For example, based on a determination and/or other operation regarding a line of sight corresponding to communication line 710-c, access point 705-a may be adjusted to 710-b and/or 710-a.

For example, if a determination and/or other operation regarding a line of sight indicates that communication line 710-c is currently, theoretically, and/or will be in the future less able to maintain certain performance threshold and/or predetermined values, then access point 705-a may be adjusted to one or more of communication lines 710-b and/or 710-a. This adjustment may include cycling a signal over time, rotating an access point, rotating a direction of a narrow beam communication, changing a receiver direction and/or orientation, some combination, and/or other operations, among others.

In some embodiments, this adjustment may include a dynamic ability to steer the access points and/or the narrow beam communication signals based at least in part on using one or more active antennas. This active antenna design provides advantages in areas with certain topographical characteristics, including but not limited to the presence of signal inhibitors, the orientation, layout, and/or organization of the geographic area (and/or subsets), the location of CPE and/or other devices, the location, orientation, organization of one or more structures (e.g., homes, offices, buildings), some combination, and/or other information. In some embodiments, utilizing dynamically adjustable system components, such as access points, a system may adjust to one or more past, current, and/or future (based at least in part on trends, patterns, projections, calculations, etc.) system performance characteristics and/or parameters.

For example, if communication line 710-c and/or another system component relating to communication line 710-c (e.g., another access point, a CPE, a user device, etc.) are performing below a predetermined performance threshold, characteristic, and/or parameter, access point 705-a may adjust (in one or more ways) to establish a different connection with affected system component(s) and/or element(s). This permits dynamic adjustment of one or more network components to minimize effects of adverse and/or sub-standard performance (based on situations such as a service outage and/or network saturation, among others).

In some embodiments, the present system and methods enable network organization of dynamic mesh networks using narrow beam communication signals. In some embodiments, location of one more system components may be discovered, received, and/or stored. In some embodiments, this location information may be received and/or relate to geographic area information. In some embodiments, this location information may be received and/or relate to topography data. In some embodiments, this location information may be received and/or relate to analysis performed by one or more system components, including but not limited to, one or more modules of narrow beam module 215-a.

In some embodiments, the location information may include a relative location of one or more system components, structures, inhibitors, and/or other elements related to one or more other system components, structures, inhibitors, and/or other elements. For example, a relative location of a CPE device may be discovered, received and/or otherwise known and a relative distance of the CPE device and an access point and/or a narrow beam communication may be determined, identified, calculated, and/or otherwise found. In some embodiments, the location of one or more elements may be determined based at least in part on GPS information. In some embodiments, the location of one or more elements may be determined based at least in part on iBeacon (and/or some similar geo-location information and/or methods), and/or related information related to one or more structures, including those within a geographic area.

As another example, if narrow beam communication signal 720-c and/or another system component relating to access point 705-b (e.g., another access point, a CPE, a user device, etc.) are performing below a predetermined performance characteristic and/or parameter, access point 705-b may adjust (in one or more ways) to establish a different connection with affected system component(s) and/or element(s). For example, access point 705-b may adjust and/or be adjusted (based on a communication from one or more other system components and/or elements, such as a remote server 145 utilizing an algorithm), so narrow beam communication signal 720-c now additionally and/or alternatively transmits in a different direction, as shown by narrow beam communication signal 720-a. This adjustment may permit one access point to facilitate service for multiple CPEs and/or other devices based on any number of reasons, characteristics, parameters, and/or other information. This permits dynamic adjustment of one or more network components to minimize effects of adverse and/or sub-par performance (such as a service outage and/or network saturation, among others).

In some embodiments, potential adjustments (relating to an access point and/or another system component) may be weighed, evaluated, and/or analyzed. This weighing, evaluating, and/or analyzing may be based at least in part on one or more operating characteristics of one or more other system components. For example, to determine and/or analyze whether and/or how an adjustment should be made, the relative orientations of two different narrow beam communication signals may be analyzed, including but not limited to determining whether one or more alternative orientations is more or less parallel to another, more or less orthogonal to another, the relative strength of the signals, the relative channels of the signals, one or more operating characteristics and/or parameters, and/or some combination, among other things.

As another example, if narrow beam communication signal 720-c and/or another system component relating to access point 705-b (e.g., another access point, a CPE, a user device, etc.) are projected to perform below a predetermined performance characteristic and/or parameter, access point 705-b may adjust (in one or more ways) to establish a different connection with affected system component(s) and/or element(s). In some embodiments, this projection (and/or one or more other operations such as analyzing) may be based at least in part on historical performance including trends, patterns, alerts, performance changes, high volume usage times, and/or other information relating to one or more access points, CPEs, user devices. In some embodiments, this projection may be based at least in part on calculated and/or future performance relating to one or more access points, CPEs, user devices, among other things. This calculated performance may be based in part on current performance parameters and/or characteristics as well as projected performance parameters and/or characteristics.

For example, access point 705-b may adjust and/or be adjusted (based on a communication from one or more other system components and/or elements, such as a remote server 145 utilizing an algorithm), so narrow beam communication signal 720-c now additionally and/or alternatively transmits in a different direction, as shown by narrow beam communication signal 720-a during one or more times that have historically required and/or performed additional uplink and/or downlink transmissions. This adjustment may permit one access point to facilitate service for multiple CPEs and/or other devices based on any number of reasons, characteristics, parameters, and/or other information. This permits dynamic adjustment of one or more network components to minimize effects of adverse and/or sub-standard performance (such as a service outage and/or network saturation, among others).

In some embodiments, based at least in part on one or more operations, in theory and/or in actual practice access point 705-b and/or 705-c may be adjusted based on one or more operations, narrow beam communication signals, communication lines, other system components and/or elements, some combination, and/or others. For example, based on a determination and/or other operation regarding an operation of, a request by, a network performance parameter and/or characteristic, a user equipment operation, some combination, and/or other information, a narrow beam communication signal (e.g., 720-a) may be adjusted.

For example, if a determination and/or other operation regarding a narrow beam communication signal and one or more other components and/or elements of a system indicates a need for additional narrow beam communication signal in a different area then access point 705-b may perform one or more adjustments. This adjustment may include cycling a signal over time, rotating an access point, modifying one or more operations performed by a narrow beam module 215-a, modifying one or more steps and/or operations relating to an algorithm, changing a receiver and/or a transmitter direction and/or orientation, changing a direction of one or more narrow beam communication signals, some combination, and/or other operations, among others.

As another example, in some embodiments, access point 705-b may be configured and/or capable of adjusting a narrow beam communication signal based at least in part on information related to one or more system components and/or elements, such as access point 705-c, narrow beam communication signal 725-a, narrow beam communication signal 725-b, some combination, and/or other information. For example, assuming access point 705-c is transmitting narrow beam communication signal 725-a, access point 705-b may adjust from transmitting narrow beam communication signal 720-b to transmitting narrow beam communication signal 720-a.

As another example, assuming access point 705-b is transmitting narrow beam communication signal 720-c, access point 705-c may adjust from transmitting narrow beam communication signal 725-b to transmitting narrow beam communication signal 725-a. In some embodiments, this adjustment may be based at least in part on a relative direction of and/or relative location relating to narrow beam communication signal 720-b and narrow beam communication signal 725-a, narrow beam communication signal 720-a and narrow beam communication signal 725-a, narrow beam communication signal 720-c and narrow beam communication signal 725-b, narrow beam communication signal 720-c and narrow beam communication signal 725-a, access point 705-b and access point 705-c, other system components and/or elements, some combination, and/or other information.

Figure 10:
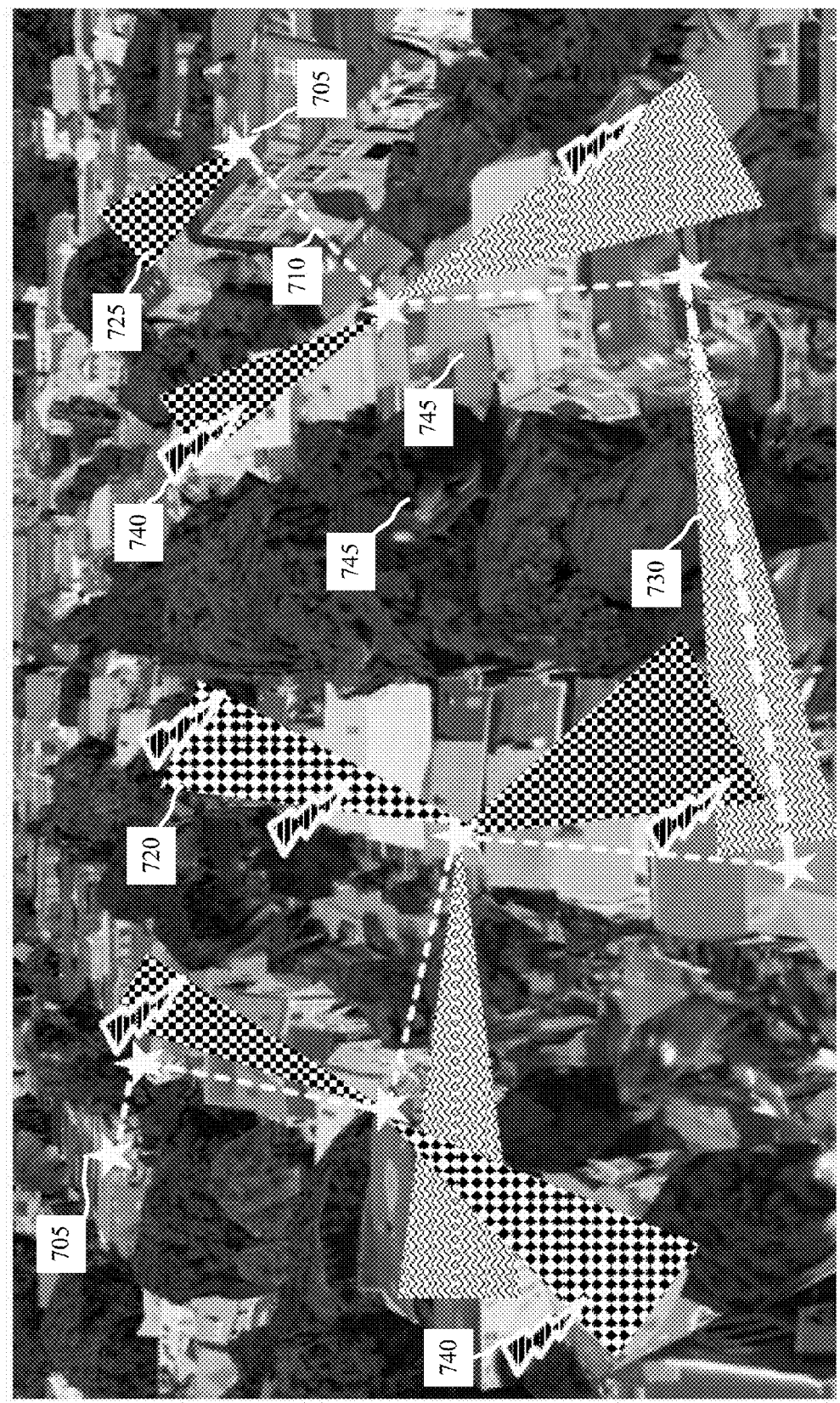
FIG. 10 shows designs illustrating exemplary methods relating to wireless networking and communication systems, in accordance with various aspects of this disclosure.

FIG. 10 illustrates examples of system 1000 in accordance with the present systems, apparatuses, and methods. In some embodiments, one or more components of system 1000 may include the same, similar and/or different functions, characteristics, performance, and/or other information relating to other systems, access points, devices, apparatuses, remote servers, and/or modules related to this disclosure, including relating to FIGS. 1-9 and 11-16. In some embodiments, system 1000 may include access points 705 (depicted as stars), communication lines 710 (white dotted lines), narrow beam communication signals (e.g., 720, 725, and 730), equipment 740 (e.g., CPEs, user devices such as mobile phone, tablets, etc.), signal inhibitors 745, and/or other components. In some embodiments, the narrow beam communication signals may include one or more of the same, similar, and/or different properties, functions, characteristics, parameters, and/or other information.

In some embodiments, system 1000 may include positioning one or more system components relative to one or more structures, signal inhibitors, locations, and/or lines of sight. For example, an access point 705 may be positioned (or one or more alternative positions determined, identified, calculated, and/or otherwise compared) related to one or more other access points communication lines 710, lines of sight, narrow beam communication signals (e.g., 720, 725, and 730), equipment 740 (e.g., CPEs, user devices such as mobile phone, tablets, etc.), signal inhibitors 745, some combination, and/or other elements.

This organization and/or positioning may facilitate one or more access points 705 providing multiple narrow beam communication signals (e.g., 720 and 725). This organization and/or positioning may facilitate one or more access points 705 communicating with multiple pieces of equipment 740, including multiple CPEs, multiple apparatuses, multiple user devices, devices, some combination, and/or other devices.

In some embodiments, the present system and methods provide advantages based at least in part on one or more operations, such as those performed by narrow beam module 215-a. In some embodiments, the present system and methods provide advantages based at least in part on the locations of one or more access points. In some embodiments, the present system and methods provide advantages based at least in part on the one or more lines of sight relating to two or more system components and/or elements.

In some embodiments, the present system and methods facilitate a network of narrow beam communication based at least in part on the location of one or more access points 705. In some embodiments, these access points may be positioned on a roof of a structure in a geographic area, as shown in the exemplary FIG. 10. Certain applications of communication signals, networks, and systems require distinct organization and positioning on environmental factors, including the position and related characteristics of signal inhibitors.

Based at least in part on the operations relating to narrow beam module 215-a (among other components), it may be determined that one or more access points 705 should be positioned at a point on a roof of a structure to avoid interference with signal inhibitors and other components. In some embodiments, this rooftop placement allows for less attenuated signals and greater uplink and downlink communication speeds by avoiding inhibitors that may block a line of sight, which impact millimeter and non-millimeter signals to varying degrees. In some embodiments, instead of placing the access points and/or other components in a structure, on a side of a structure, at a street level (on a side of a home, on a pole, or otherwise), the access points and/or other components may be placed on a rooftop to avoid often-present inhibitors such as streets lined with foliage, poles, vegetation, vehicles, and/or buildings, among others.

In some embodiments, placing the access points 705 and/or other components on a rooftop may provide a relatively unchanging, line of sight path from an access point to one or more pieces of equipment 740 and/or other access points 705 to facilitate system performance over time. In some embodiments, this unchanging line of sight path may be based on locations and/or patterns of signal inhibitor positioning, including the location, planting, growth, and/or other characteristics of foliage such as trees and shrubs, structures, and/or other signal inhibitors, as illustrated in FIG. 10, among others.

In some embodiments, two or more narrow beam communications (e.g., 730) may be positioned relative to one another, relative to one or more pieces of equipment 740, signal inhibitors 745, and/or other components and/or elements. For example, a first narrow beam communication signal 730 sent from a first access point 705 may be oriented generally south and may have certain characteristics. A second narrow beam communication signal 730 sent from a second access point 705 may be oriented generally west and may have some of the same and/or similar characteristics to the first narrow beam communication signal. Based at least in part on the network design and/or organization from the present systems and methods, channel reuse, and/or interference minimization may employed without adversely affecting system and network performance.

Figure 11:
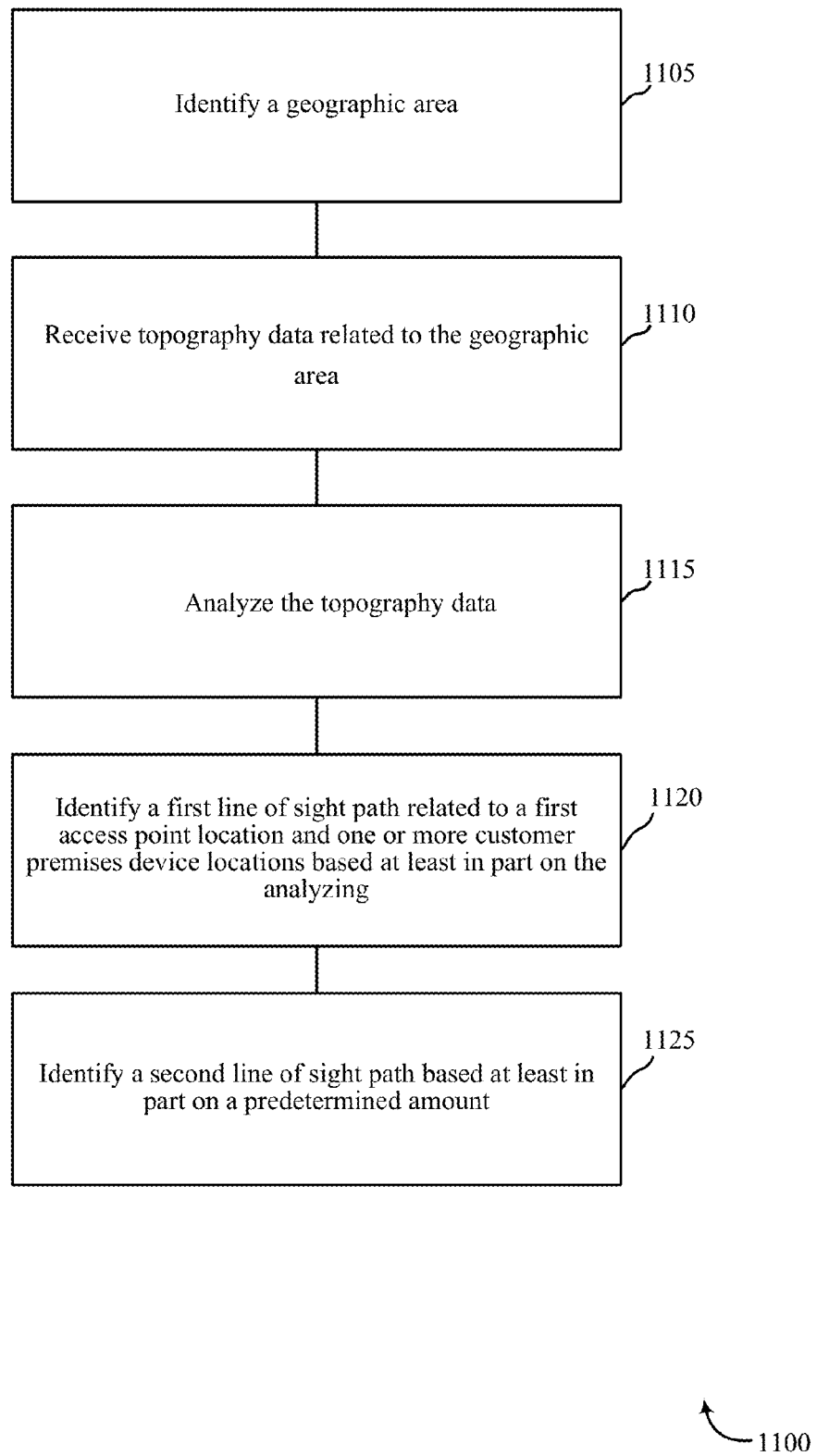
FIG. 11 is a flow chart illustrating exemplary methods relating to wireless networking and communication systems, in accordance with various aspects of this disclosure.

FIG. 11 is a flow chart illustrating an example of a method 1100 for narrow beam wireless communications, in accordance with various aspects of the present disclosure. For clarity, the method 1100 is described below with reference to aspects of one or more embodiments of the narrow beam modules 215, the access points 101, the apparatuses 105, the remote servers 145, and/or the devices 115, described with reference to FIGS. 1-10. In some examples, an apparatus, an access point, a remote server, and/or one or more devices may execute one or more sets of codes to control the functional elements of an apparatus, an access point, and/or one or more devices to perform the functions described below. Additionally or alternatively, another device 115 (e.g., a user device) may perform one or more of the functions described below using special-purpose hardware.

At block 1105, the method 1100 may include identifying a geographic area. At block 1110, the method 1100 may include receiving topography data related to the geographic area. At block 1115, the method 1100 may include analyzing the topography data. At block 1120, the method 1100 may include identifying a first line of sight path related to a first access point location and one or more customer premises device locations based at least in part on the analyzing. At block 1125, the method 1100 may include identifying a second line of sight path based at least in part on a predetermined amount.

At least some of the operations at blocks 1105-1125 may be performed using the narrow beam module 215-a (and variations) described with reference to FIGS. 2 and 3, among others.

Thus, the method 1100 may relate to narrow beam communications relating to wireless communication systems. It should be noted that the method 1100 is just one implementation and that the operations of the method 1100 may be rearranged or otherwise modified such that other implementations are possible.

Figure 12:
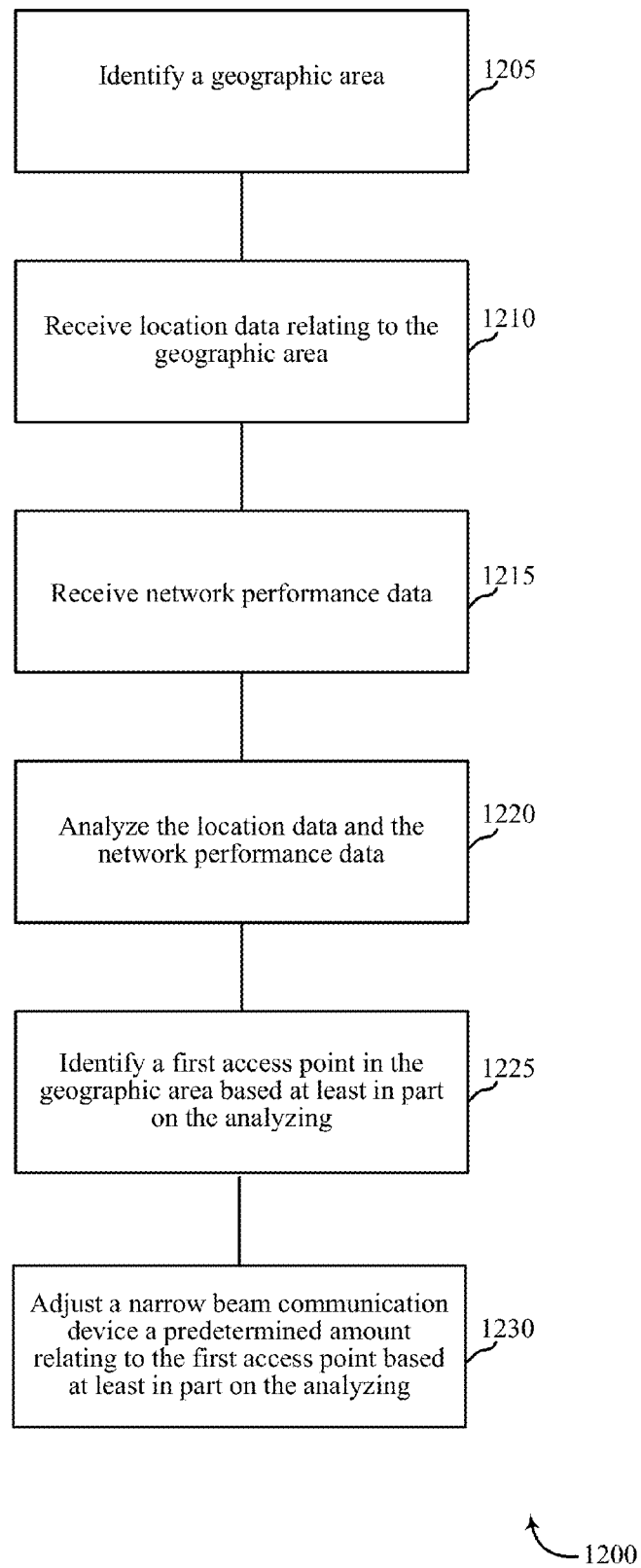
FIG. 12 is a flow chart illustrating exemplary methods relating to wireless networking and communication systems, in accordance with various aspects of this disclosure.

FIG. 12 is a flow chart illustrating an example of a method 1200 for narrow beam wireless communications, in accordance with various aspects of the present disclosure. For clarity, the method 1200 is described below with reference to aspects of one or more embodiments of the narrow beam modules 215, the access points 101, the apparatuses 105, the remote servers 145, and/or the devices 115, described with reference to FIGS. 1-10. In some examples, an apparatus, an access point, a remote server, and/or one or more devices may execute one or more sets of codes to control the functional elements of an apparatus, an access point, and/or one or more devices to perform the functions described below. Additionally or alternatively, another device 115 (e.g., a user device) may perform one or more of the functions described below using special-purpose hardware.

At block 1205, the method 1200 may include identifying a geographic area. At block 1210, the method 1200 may include receiving location data relating to the geographic area. At block 1215, the method 1200 may include receiving network performance data. At block 1220, the method 1200 may include analyzing the location data and/or the network performance data.

At block 1225, the method 1200 may include identifying a first access point in the geographic area based at least in part on the analyzing. At block 1230, the method 1200 may include adjusting a narrow beam communication device a predetermined amount relating to the first access point based at least in part on the analyzing.

At least some of the operations at blocks 1205-1225 may be performed using the narrow beam module 215-a (and variations) described with reference to FIGS. 2 and 3, among others.

Thus, the method 1200 may relate to narrow beam communications relating to wireless communication systems. It should be noted that the method 1200 is just one implementation and that the operations of the method 1200 may be rearranged or otherwise modified such that other implementations are possible.

Figure 13:
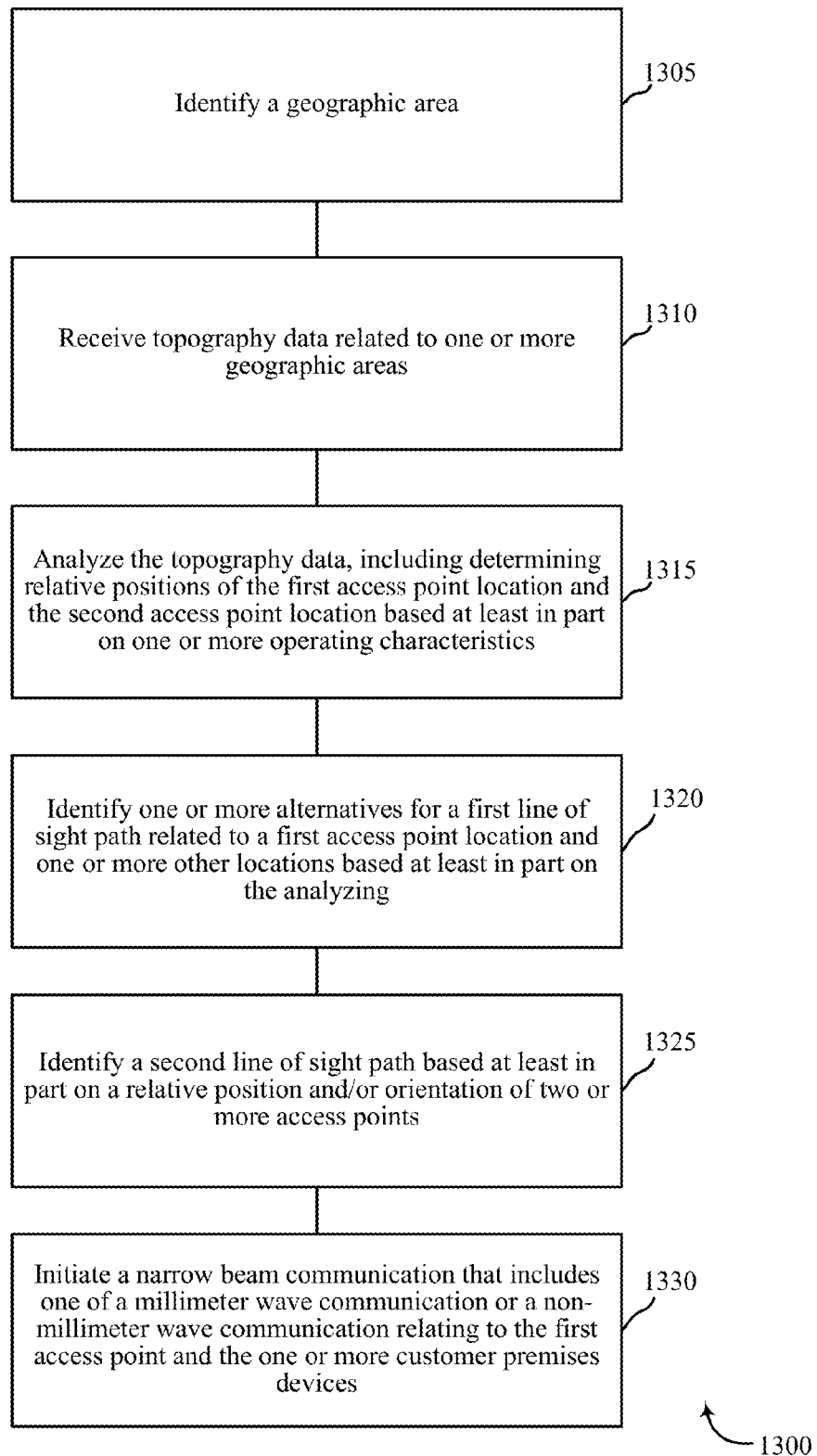
FIG. 13 is a flow chart illustrating exemplary methods relating to wireless networking and communication systems, in accordance with various aspects of this disclosure.

FIG. 13 is a flow chart illustrating an example of a method 1300 for narrow beam wireless communications, in accordance with various aspects of the present disclosure. For clarity, the method 1300 is described below with reference to aspects of one or more embodiments of the narrow beam modules 215, the access points 101, the apparatuses 105, the remote servers 145, and/or the devices 115, described with reference to FIGS. 1-10. In some examples, an apparatus, an access point, a remote server, and/or one or more devices may execute one or more sets of codes to control the functional elements of an apparatus, an access point, and/or one or more devices to perform the functions described below. Additionally or alternatively, another device 115 (e.g., a user device) may perform one or more of the functions described below using special-purpose hardware.

At block 1305, the method 1300 may include identifying a geographic area. At block 1310, the method 1300 may include receiving topography data related to one or more geographic areas. At block 1315, the method 1300 may include analyzing the topography data, including determining relative positions of the first access point location and the second access point location based at least in part on one or more operating characteristics.

At block 1320, the method 1300 may include identifying one or more alternatives for a first line of sight path related to a first access point location and one or more other locations based at least in part on the analyzing. At block 1325, the method 1300 may include identifying a second line of sight path based at least in part on a relative position and/or orientation of two or more access points. At block 1330, the method 1300 may include initiating a narrow beam communication that includes one of a millimeter wave communication or a non-millimeter wave communication relating to the first access point and the one or more customer premises devices.

At least some of the operations at blocks 1305-1330 may be performed using the narrow beam module 215-a (and variations) described with reference to FIGS. 2 and 3, among others.

Thus, the method 1300 may relate to narrow beam communications relating to wireless communication systems. It should be noted that the method 1300 is just one implementation and that the operations of the method 1300 may be rearranged or otherwise modified such that other implementations are possible.

Figure 14:
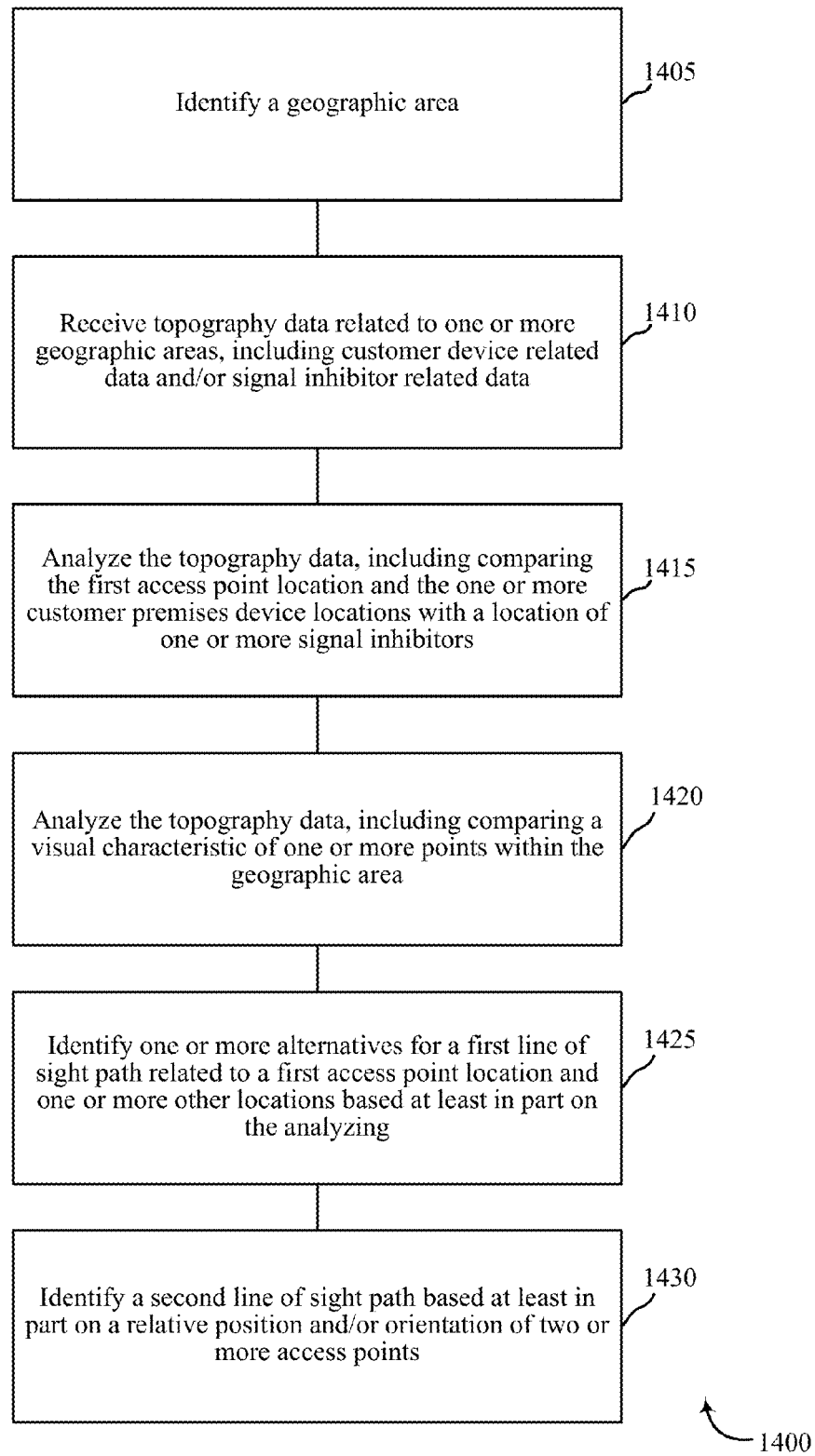
FIG. 14 is a flow chart illustrating exemplary methods relating to wireless networking and communication systems, in accordance with various aspects of this disclosure.

FIG. 14 is a flow chart illustrating an example of a method 1400 for narrow beam wireless communications, in accordance with various aspects of the present disclosure. For clarity, the method 1400 is described below with reference to aspects of one or more embodiments of the narrow beam modules 215, the access points 101, the apparatuses 105, the remote servers 145, and/or the devices 115, described with reference to FIGS. 1-10. In some examples, an apparatus, an access point, a remote server, and/or one or more devices may execute one or more sets of codes to control the functional elements of an apparatus, an access point, and/or one or more devices to perform the functions described below. Additionally or alternatively, another device 115 (e.g., a user device) may perform one or more of the functions described below using special-purpose hardware.

At block 1405, the method 1400 may include identifying a geographic area. At block 1410, the method 1400 may include receiving topography data related to one or more geographic areas, including customer device related data and/or signal inhibitor related data. At block 1415, the method 1400 may include analyzing the topography data, including comparing the first access point location and the one or more customer premises device locations with a location of one or more signal inhibitors.

At block 1420, the method 1400 may include analyzing the topography data, including comparing a visual characteristic of one or more points within the geographic area. At block 1425, the method 1400 may include identifying one or more alternatives for a first line of sight path related to a first access point location and one or more other locations based at least in part on the analyzing. At block 1430, the method 1400 may include identifying a second line of sight path based at least in part on a relative position and/or orientation of two or more access points.

At least some of the operations at blocks 1405-1430 may be performed using the narrow beam module 215-a (and variations) described with reference to FIGS. 2 and 3, among others.

Thus, the method 1400 may relate to narrow beam communications relating to wireless communication systems. It should be noted that the method 1400 is just one implementation and that the operations of the method 1400 may be rearranged or otherwise modified such that other implementations are possible.

Figure 15:
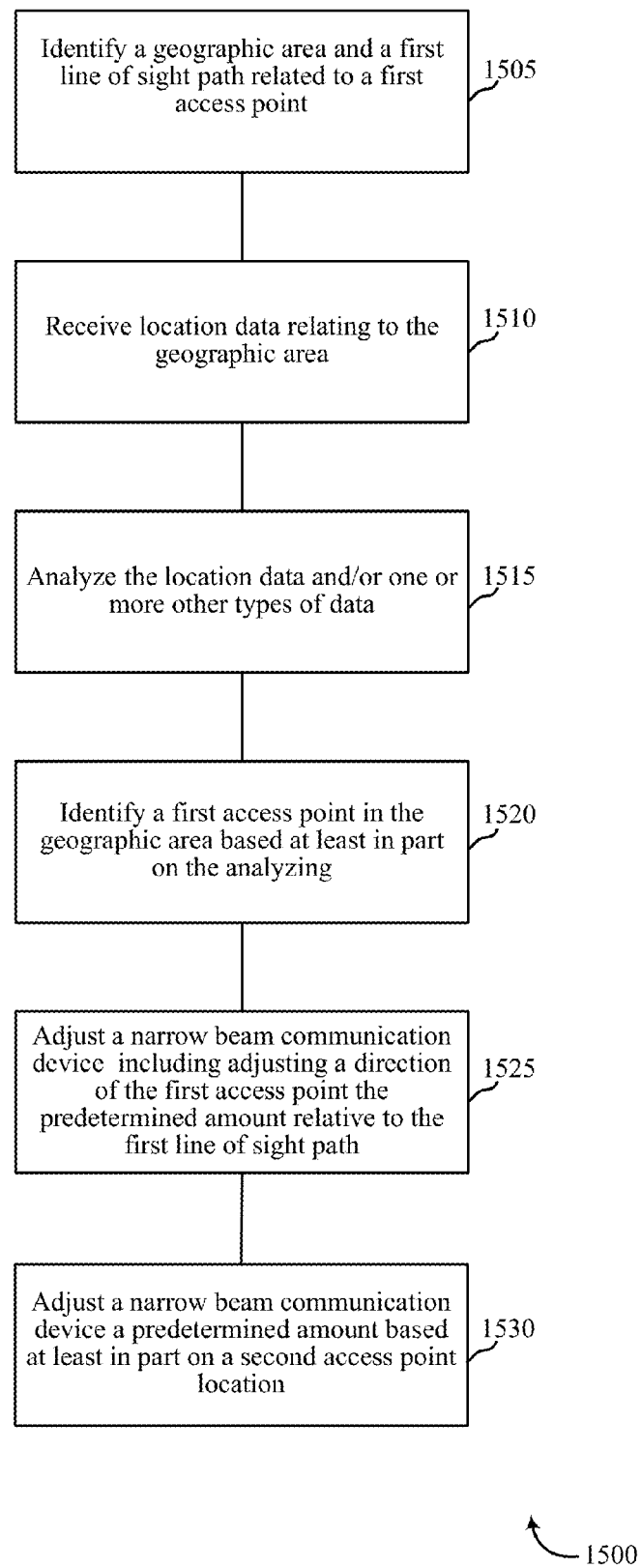
FIG. 15 is a flow chart illustrating exemplary methods relating to wireless networking and communication systems, in accordance with various aspects of this disclosure.

FIG. 15 is a flow chart illustrating an example of a method 1500 for narrow beam wireless communications, in accordance with various aspects of the present disclosure. For clarity, the method 1500 is described below with reference to aspects of one or more embodiments of the narrow beam modules 215, the access points 101, the apparatuses 105, the remote servers 145, and/or the devices 115, described with reference to FIGS. 1-10. In some examples, an apparatus, an access point, a remote server, and/or one or more devices may execute one or more sets of codes to control the functional elements of an apparatus, an access point, and/or one or more devices to perform the functions described below. Additionally or alternatively, another device 115 (e.g., a user device) may perform one or more of the functions described below using special-purpose hardware.

At block 1505, the method 1500 may include identifying a geographic area and a first line of sight path related to a first access point. At block 1510, the method 1500 may include receiving location data relating to the geographic area. At block 1515, the method 1500 may include analyzing the location data and/or one or more other types of data. At block 1520, the method 1500 may include identifying a first access point in the geographic area based at least in part on the analyzing.

At block 1525, the method 1500 may include adjusting a narrow beam communication device including adjusting a direction of the first access point the predetermined amount relative to the first line of sight path. At block 1530, the method 1500 may include adjusting a narrow beam communication device a predetermined amount based at least in part on a second access point location.

At least some of the operations at blocks 1505-1530 may be performed using the narrow beam module 215-a (and variations) described with reference to FIGS. 2 and 3, among others.

Thus, the method 1500 may relate to narrow beam communications relating to wireless communication systems. It should be noted that the method 1500 is just one implementation and that the operations of the method 1500 may be rearranged or otherwise modified such that other implementations are possible.

Figure 16:
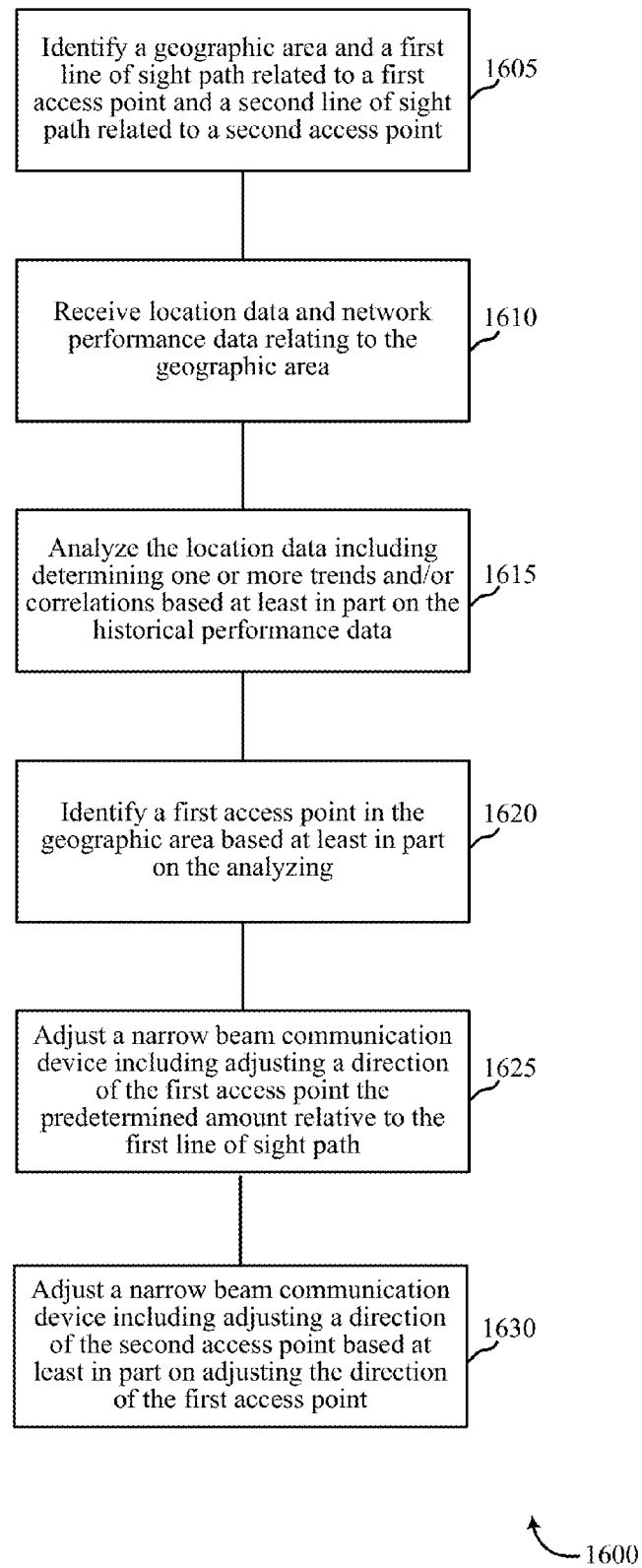
FIG. 16 is a flow chart illustrating exemplary methods relating to wireless networking and communication systems, in accordance with various aspects of this disclosure.

FIG. 16 is a flow chart illustrating an example of a method 1600 for narrow beam wireless communications, in accordance with various aspects of the present disclosure. For clarity, the method 1600 is described below with reference to aspects of one or more embodiments of the narrow beam modules 215, the access points 101, the apparatuses 105, the remote servers 145, and/or the devices 115, described with reference to FIGS. 1-10. In some examples, an apparatus, an access point, a remote server, and/or one or more devices may execute one or more sets of codes to control the functional elements of an apparatus, an access point, and/or one or more devices to perform the functions described below. Additionally or alternatively, another device 115 (e.g., a user device) may perform one or more of the functions described below using special-purpose hardware.

At block 1605, the method 1600 may include identifying a geographic area and a first line of sight path related to a first access point and a second line of sight path related to a second access point. At block 1610, the method 1600 may include receiving location data and/or network performance data relating to the geographic area. At block 1615, the method 1600 may include analyzing the location data including determining one or more trends and/or correlations based at least in part on the historical performance data.

At block 1620, the method 1600 may include identifying a first access point in the geographic area based at least in part on the analyzing. At block 1625, the method 1600 may include adjusting a narrow beam communication device including adjusting a direction of the first access point the predetermined amount relative to the first line of sight path. At block 1630, the method 1600 may include adjusting a narrow beam communication device including adjusting a direction of the second access point based at least in part on adjusting the direction of the first access point.

At least some of the operations at blocks 1605-1630 may be performed using the narrow beam module 215-a (and variations) described with reference to FIGS. 2 and 3, among others.

Thus, the method 1600 may relate to narrow beam communications relating to wireless communication systems. It should be noted that the method 1600 is just one implementation and that the operations of the method 1600 may be rearranged or otherwise modified such that other implementations are possible.

In some examples, aspects from two or more of the methods 1100, 1200, 1300, 1400, 1500, and/or 1600 may be combined, omitted, separated, and/or otherwise modified. It should be noted that the methods 1100, 1200, 1300, 1400, 1500, 1600, etc. are just example implementations, and that the operations of the methods 1100-1600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for wireless networking and communications, comprising:
    identifying a visual characteristic associated with a geographic area;
    receiving topography data associated with the geographic area;
    comparing the visual characteristic associated with the geographic area and the topography data;
    identifying a current location of a user device associated with the geographic area;
    identifying a first line of sight path associated with a first access point location and the user device based at least in part on the comparing;
    identifying a second line of sight path based at least in part on the first line of sight path, the second line of sight path being different from the first line of sight path; and
    adjusting a characteristic of an antenna associated with the first access point based at least in part on identifying the second line of sight path.

2. The method of claim 1, wherein identifying the visual characteristic associated with the geographic area comprises:
    determining at least one of a texture, a color, a shape, a reflectivity, a structure type, or a combination thereof.

3. The method of claim 1, wherein adjusting the characteristic of the antenna comprises:
    adjusting a narrow beam communication.

4. The method of claim 3, wherein adjusting the narrow beam communication further comprises:
    adjusting a frequency associated with the narrow beam communication, or a channel associated with the narrow beam communication, or a strength of the narrow beam communication, or a communication direction, or a communication width, or a horizontal narrow beam communication characteristic, or a vertical narrow beam communication characteristic, or a location of a component, or a combination thereof.

5. The method of claim 3, further comprising:
    receiving network performance data associated with the user device;
    determining a weight value based at least in part on the identified visual characteristic of the geographic area, the topography data, and the identified location of the user device;
    applying the weight value to the narrow beam communication based at least in part on the network performance data; and
    wherein adjusting the narrow beam communication is based at least in part on the weight value.

6. The method of claim 5, further comprising:
    determining an existence of a signal inhibitor from the topography data; and
    adjusting the weight value based at least in part on determining the existence of the signal inhibitor.

7. The method of claim 3, further comprising:
    determining an anticipated change in the topography data within a predetermined time frame, wherein adjusting the narrow beam communication is based at least in part on the anticipated change.

8. The method of claim 1, wherein receiving the topography data comprises:
    receiving the topography data from an aerial representation associated with the geographic area.

9. An apparatus for wireless networking and communications, comprising:
    a processor;
    memory in electronic communication with the processor; and
    instructions stored in the memory, the instructions being executable by the processor to cause the apparatus to:
        identify a visual characteristic associated with a geographic area;
        receive topography data associated with the geographic area;
        compare the visual characteristic associated with the geographic area and the topography data;

identify a current location of a user device associated with the geographic area;

identify a first line of sight path associated with a first access point location and the user device based at least in part on the comparing;

identify a second line of sight path based at least in part on the first line of sight path, the second line of sight path being different from the first line of sight path; and adjust a characteristic of an antenna associated with the first access point based at least in part on identifying the second line of sight path.

10. The apparatus of claim 9, wherein when the processor identifies the visual characteristic associated with the geographic area, the instructions further cause the processor to cause the apparatus to:

determine at least one of a texture, a color, a shape, a reflectivity, a structure type, or a combination thereof.

11. The apparatus of claim 9, wherein when the processor adjusts the characteristic of the antenna, the instructions further cause the processor to cause the apparatus to:

adjust a narrow beam communication.

12. The apparatus of claim 11, wherein when the processor adjusts the narrow beam communication, the instructions further cause the processor to cause the apparatus to:

adjust a frequency associated with the narrow beam communication, a channel associated with the narrow beam communication, a strength of the narrow beam communication, a communication direction, a communication width, a horizontal narrow beam communication characteristic, a vertical narrow beam communication characteristic, a location of a component, or a combination thereof.

13. The apparatus of claim 11, wherein the instructions further cause the processor to cause the apparatus to:

receive network performance data associated with the user device;

determine a weight value based at least in part on the identified visual characteristic of the geographic area, the topography data, and the identified location of the user device;

apply the weight value to the narrow beam communication based at least in part on the network performance data; and wherein adjusting the narrow beam communication is based at least in part on the weight value.

14. The apparatus of claim 13, wherein the instructions further cause the processor to cause the apparatus to:

determine an existence of a signal inhibitor from the topography data; and adjust the weight value based at least in part on determining the existence of the signal inhibitor.

15. The apparatus of claim 11, wherein when the processor adjusts the narrow beam communication, the instructions further cause the processor to cause the apparatus to:

determine an anticipated change in the topography data within a predetermined time frame, wherein adjusting the narrow beam communication is based at least in part on the anticipated change.

16. The apparatus of claim 9, wherein when the processor receives the topography data, the instructions further cause the processor to cause the apparatus to:

receive the topography data from an aerial device associated with the geographic area.

17. A non-transitory computer-readable medium storing computer-executable code, the code executable by a processor to:

identify a visual characteristic associated with a geographic area;

receive topography data associated with the geographic area;

compare the visual characteristic associated with the geographic area and the topography data;

identify a current location of a user device associated with the geographic area;

identify a first line of sight path associated with a first access point location and the user device based at least in part on the comparing;

identify a second line of sight path based at least in part on the first line of sight path, the second line of sight path being different from the first line of sight path; and adjust a characteristic of an antenna associated with the first access point based at least in part on identifying the second line of sight path.

18. The non-transitory computer-readable medium of claim 17, wherein when the processor identifies the visual characteristic associated with the geographic area, the code further causes the processor to:

determine at least one of a texture, a color, a shape, a reflectivity, a structure type, or a combination thereof.

19. The non-transitory computer-readable medium of claim 17, wherein when the processor adjusts the characteristic of the antenna, the code further causes the processor to:

adjust a narrow beam communication.

20. The non-transitory computer-readable medium of claim 19, wherein when the processor adjusts the narrow beam communication, the code further causes the processor to:

adjust a frequency associated with the narrow beam communication, a channel associated with the narrow beam communication, a strength of the narrow beam communication, a communication direction, a communication width, a horizontal narrow beam communication characteristic, a vertical narrow beam communication characteristic, a location of a component, or a combination thereof.

* * * * *